US010053178B2

(12) United States Patent
Bleecker et al.

(10) Patent No.: US 10,053,178 B2
(45) Date of Patent: Aug. 21, 2018

(54) GAUGE TYPE BICYCLE COMPUTER

(71) Applicant: Omata, Inc., Venice, CA (US)

(72) Inventors: Julian Bleecker, Venice, CA (US); John-Rhys Newman, Woodland Hills, CA (US)

(73) Assignee: Omata, Inc., Venice, CA (US)

( * ) Notice: Subject to any disclaimer, the term of this patent is extended or adjusted under 35 U.S.C. 154(b) by 0 days.

(21) Appl. No.: 15/730,612

(22) Filed: Oct. 11, 2017

(65) Prior Publication Data

US 2018/0099718 A1     Apr. 12, 2018

Related U.S. Application Data

(60) Provisional application No. 62/407,442, filed on Oct. 12, 2016.

(51) Int. Cl.
*B62J 99/00* (2009.01)
*G01S 19/52* (2010.01)
(Continued)

(52) U.S. Cl.
CPC ............... *B62J 99/00* (2013.01); *B60R 11/02* (2013.01); *B62D 49/0692* (2013.01); *G01S 19/52* (2013.01); *B62J 2099/0026* (2013.01)

(58) Field of Classification Search
CPC ............ B62J 99/00; B62J 2099/0006; B62J 2099/0013; B62J 2099/0026; B62J 2099/0033; B62J 2099/004; B62D 49/06; B62D 49/0692; B60R 11/02; B60R 11/0258; B60R 11/027; B60R 11/0294; B60R 13/0853; B60S 1/08;
(Continued)

(56) References Cited

U.S. PATENT DOCUMENTS 4,848,154 A * 7/1989 Panzica ..................... G01P 1/02
116/280
2002/0177949 A1* 11/2002 Katayama .......... G01C 21/3632
701/431
(Continued)

*Primary Examiner* — Van Trieu
(74) *Attorney, Agent, or Firm* — Fenwick & West LLP

(57) ABSTRACT

A cycling gage assembly comprises a housing, a dial gauge face, a first antenna, a second antenna, a motor assembly a printed circuit board and a battery. The housing has a rotating bezel, a transparent cover, and a rear cover. The transparent cover structured to fit within the rotating bezel. The rotating bezel structured to fit at least partially over the rear cover. The dial gauge face has a top and a bottom and structured behind the transparent cover the dial gauge face having a first slot and a second slot, the slot. The first antenna has a portion coupled with the first slot of the dial gauge face and a portion along a bottom of the dial gauge face. The second antenna has a portion coupled with the second slot of the dial gauge face and a portion along a bottom of the dial gauge face. The motor assembly coupled with the dial gauge face. The printed circuit has a microcontroller, a Bluetooth circuit and a global positioning system (GPS) circuit. The microcontroller coupled to drive the motor assembly. The Bluetooth circuit coupled with the first antenna and the GPS circuit coupled with the second antenna. The battery is coupled with the printed circuit board to provide power to the printed circuit board.

15 Claims, 24 Drawing Sheets

(51) Int. Cl.
*B62D 49/06* (2006.01)
*B60R 11/02* (2006.01)

(58) Field of Classification Search
CPC ....... B60W 2300/36; B60W 2300/365; B60W 2300/367; B60K 2350/1056; B60K 2350/1064; B60K 2350/1072; B60K 37/00; B60K 37/02; G01S 19/19; G01S 19/48; G01S 19/51; G01S 19/52
See application file for complete search history.

(56) References Cited

U.S. PATENT DOCUMENTS

2007/0247377 A1* 10/2007 Funayose ................. B62J 99/00
  343/711
2010/0274485 A1* 10/2010 Tsuchida ................ G01C 21/28
  701/472
2014/0225754 A1    8/2014 McCord et al.
2017/0003149 A1*  1/2017 Berk ...................... G01D 11/26

\* cited by examiner

US 10,053,178 B2

GAUGE TYPE BICYCLE COMPUTER

CROSS REFERENCE TO RELATED APPLICATIONS

This application claims the benefit of U.S. Provisional Application No. 62/407,442, filed Oct. 12, 2016, which is incorporated by reference in its entirety.

BACKGROUND

A bicycle computer is a device that uses a microcontroller to compute, record and display information to a cyclist as to their activity, such as velocity, distance traveled, vertical ascent, power output by the cyclist's effort, cadence, heart rate, amongst other possible information. Such bicycle computers may use a variety of sensors to capture, record, transmit and represent such information including GPS, Barometric Pressure Sensors, Power Meters, Cadence Sensors, Heart Rate Sensors, some or all of which may be connected to transmit sensor information in a wired or wireless manner to the device.

Typically, bicycle computers use digital displays such as, for example, liquid crystal display (LCD) or organic light emitting diode (OLED) display technology interfaced to a digital microcontroller, predominantly representing data numerically (as digits). In some cases, a bicycle computer may display a gauge type.

The disadvantages of digital (numerical) display of data is generally understood by those skilled in the arts of instrument design for the display of mission-critical information. Specifically, and relevant in the context of measuring useful real-time information for a moving vehicle (including but not limited to bicycles, motorcycles, automobiles, airplanes, marine vessels, locomotives) the display of information in gauge-type representations proves more legible in contexts where the interpretation of that information should not be overly distracting or where cognitive load is a significant factor to be managed as in, for example, a fast moving vehicle.

Typically, any bicycle computers that display data using a gauge-type display use a microcontroller connected to a digital display such as an LCD or OLED display interfaced to a digital microcontroller, to represent data in a computationally rendered graphical facsimile of true gauge-type indicators. However, there are disadvantages to a digital display in the general case of LCD, OLED and other modern display technologies appropriate for the display of rapidly changing information (i.e., not so-called "E Ink" bi-stable display technology, which is known to be unsuitable for contexts in which the display must show rapidly changing information) in that they must be constantly energized to function. Thus, they require a constant power supply in order to represent useful real-time, mission critical data to a cyclist, therefore requiring more overall power usage than systems in which the display need not be constantly energized.

Additionally, bicycle speedometers and odometers, may also display information to a cyclist using gauge-type indicators. In order to represent useful data to the cyclist of the true gauge-type, speedometers and odometers typically use mechanical linkages and couplings to articulate mechanical indicators. Also, speedometers or combination speedometer-odometers are referred to as such because they are unable to represent other data useful to the cyclist beyond velocity, distance and in some cases pedaling cadence or revolutions-per-minute of a wheel. In addition mechanically coupled instruments introduce mechanical friction which must be overcome by the cyclist's pedaling effect, such that less of the cyclist's pedaling effort contributes to the motion of the bicycle itself.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
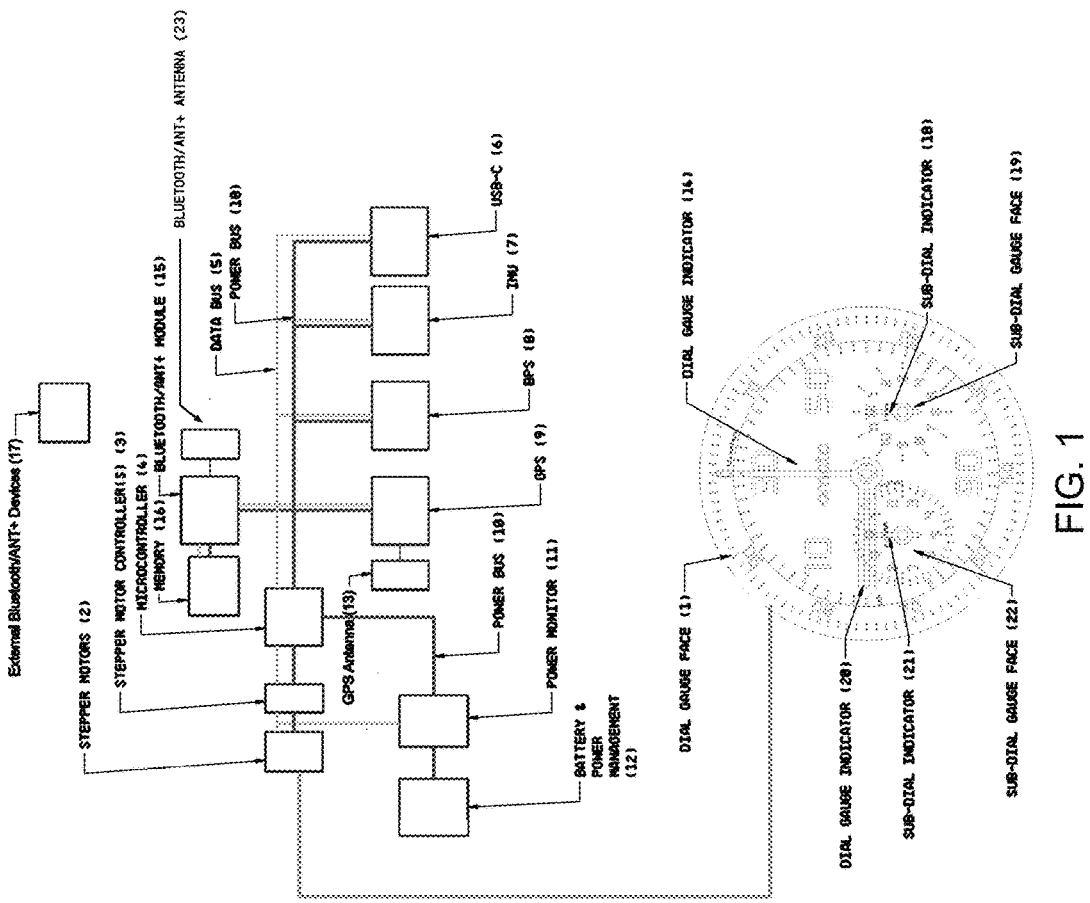
FIG. 1 is a schematic diagram of an example disclosed bicycle computer in accordance with one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A bicycle computer may include a gauge-type display that may represent velocity, distance, vertical ascent, duration, current time of day, power output of the cyclist, cadence (revolutions detected at pedals and crank), heart rate of the cyclist, current compass direction, average velocity, or directional turn to follow a preset path. These representations are indicated via indicator hands mechanically connected to stepper motors which are in turn controlled by stepper motor controllers in communication with a microcontroller. The microcontroller is in communication over a data bus with a plurality of sensors, for example, GPS, barometric pressure sensor, and/or real-time clock. Some sensors, for example, power output sensor, cadence sensor, heart rate monitor, may be remotely attached to various parts of the bicycle or cyclist, and in communication with the microcontroller using wireless communication links and protocols, The bicycle computer may be mounted on a bicycle. The bicycle computer may calculate and display data that may correspond with a travel path. This data may be velocity, distance, vertical ascent, duration, current time of day, power output of the cyclist, cadence (revolutions detected at pedals and crank), heart rate of the cyclist, current compass direction, average velocity, and/or directional turn to follow a preset path.

The gauge-type bicycle computer provides improvements over the art in several areas, for example, spatial legibility, clarity in the presentation of changes in significant data sets, battery life, and antenna optimization. Moreover, the principles disclosed herein may apply to other vehicles in addition to bicycles.

Existing global positioning system (GPS) bicycle computers necessarily use materials for the digital display which are largely opaque to radio frequency (RF) transmissions, requiring that any RF antennas used in the bicycle computer such as, for example, GPS, Bluetooth/ANT+, WiFi, 3G, 4G, LTE, be situated such that the antennas exposure to the external environment and the antennas RF radiation pattern are not blocked, obscured, reduced nor otherwise made sub-optimal by the proximity and location of a display that contains electrical-magnetic conductive materials, such as metal or other RF opaque materials. An analog-mechanical gauge-type printed face display can be readily made of materials that are relatively inert and transparent to RF energy in comparison to the electrical-magnetic conductive materials necessary for active digital display types (e.g. liquid crystal display (LCD), organic light emitting diode (OLED)). It is advantageous and desirable to situate RF antenna(s) for GPS cycling computers in the most optimal position without reducing RF system performance nor overall size of the device such as may be required in order to locate antennas away from or unobscured by the main information display (e.g., LCD, OLED). As an analog-mechanical gauge-type bicycle computer is able to use non-RF transmissive materials for its main information display (face of a dial gauge (its top portion)), and as such may embed RF antennas within or situate RF antennas directly underneath the face of the display, thereby optimizing any RF antennas exposure to the external environment and optimizing the antenna(s) RF radiation pattern.

Example Cycling Computer

The disclosed bicycle computer has its data displayed with true gauge-type indicators.

A true gauge-type indicator is an indicator hand mechanically affixed to a stepper motor or other means of rotary motion that is able to rotate the indicator hand in a circular motion around an axis central to a dial face. The disclosed bicycle computer may include a self-contained combination of gauge-type indicators, microcontroller, sensors, stepper motors, stepper motor drivers, housing, control inputs, GPS, Bluetooth/ANT+ radio, external physical electrical data connectivity, and/or internal power system.

The bicycling computer may be attached to a bicycle as a digital display-type bicycle computer would be attached. Once the bicycle computer is attached, the device may be capable of operation without requiring external power or additional sensors or controllers to operate. The bicycle computer may be attached to the bicycle handlebar or frame.

FIG. 1 is a schematic diagram of an example disclosed bicycle computer. This shows the components and processes within the bicycle computer. The bicycle computer may comprise a microcontroller (4) that is in communication with a number of sensing devices, including: a GPS (9) which is in signal communication with GPS satellite network; Barometric Pressure Sensor (8) which measures ambient barometric pressure; Inertial Measurement Unit (7) which measures inertial forces including rotation and acceleration across 3, 6 or 9-axes and magnetic compass heading; a network of wirelessly communicating sensors through Bluetooth/ANT+ networks that may include a sensor to detect pedaling cadence, power output of the cyclist as measured in the bicycle drivetrain or elsewhere, a real-time clock or combinations of these sensors as in, for example, direction indicators to determine where a cyclist should turn to maintain a pre-determined course or route based on current location and heading.

The system operates drawing power from a Battery and Power Management (12) via a Power Bus (10) contained entirely within and internal to the overall assembly. The Power Monitor (11) component monitors power consumption and communicates power system state to the Microcontroller (4) across the Data Bus (5).

Together Power Monitor (11) and Battery and Power Management (12) supply power to the system across Power Bus (10) such that no additional external power systems or interfaces may be required. Battery and Power Management (12) may include a battery, power conditioning circuitry such as, for example, a voltage regulator, and battery charging circuitry, amongst other components for providing power as well as recharging.

Dial Gauge Indicators (14, 20) and Sub-Dial Indicators (18, 21) may be mechanically fixed to Stepper Motors (2) each affixed to one of Dial Gauge Indicators (14, 18, 20, 21). Stepper Motors (2) may be capable of rotating in a full 360 degrees circle so that the Dial Gauge Indicators (14, 20) and the Sub-Dial Indicators (18, 21) are rotatable and are coaxial about a center of the Dial Gauge Face (1). Dial Gauge Face (1) may represent a variety of data including, for example, current velocity, average velocity, total cumulative vertical ascent (e.g. "vertical meters climbed"), total distance traveled, current time of day, and/or duration of activity. The data may be represented through a plurality of sub-dial faces.

Dial Gauge Face (1) may be represented as showing four possible useful data using Dial Gauge Indicators (14, 20) and Sub-Dial Indicators (18, 21) some of which reside in Sub Dial Gauge Face (19,22), but may include more or fewer representations of useful data using gauge-type indicators. In such a case the Dial Gauge Face (1) may have additional or fewer indicator hands (and associated stepper motors) and additional or fewer Sub Dial Faces e.g. Sub Dial Face (19) and Sub Dial Face (22) than represented in FIG. 1.

Data represented on the main Dial Gauge Face (1), Sub-Dial Gauge Face (19), Sub-Dial Gauge Face (20) may include, but is not limited to, velocity, distance, average velocity, time of day, duration of activity, cumulative vertical ascent, current battery level, countdown timer, power exerted by the cyclist, a turn direction indicator, and/or compass directional indicator.

Each Dial Gauge Indicators (14, 20) and Sub-Dial Indicators (18, 21) may be attached to a corresponding stepper motor represented in the aggregate as Stepper Motors (2) for the purposes of a clear illustration only. It is noted that there may be one or more actual stepper motors.

The description that follows may apply to any Dial Indicator Hand and its associated Dial Face or Sub-Dial Face. For the purposes of describing the functionality by which dial indicator hands are positioned to indicate their corresponding data, the case of representing velocity on Dial Gauge Face (1) by Dial Gauge Indicator (15) will be used. Subsequent Dial Indicator Hands and their dial faces follow the same sequence of operation with the data being indicated differing from the example of velocity below, which is computed based on data from GPS (9). Other Dial Indicator Hands may derive their data from other sources.

Figure 18:
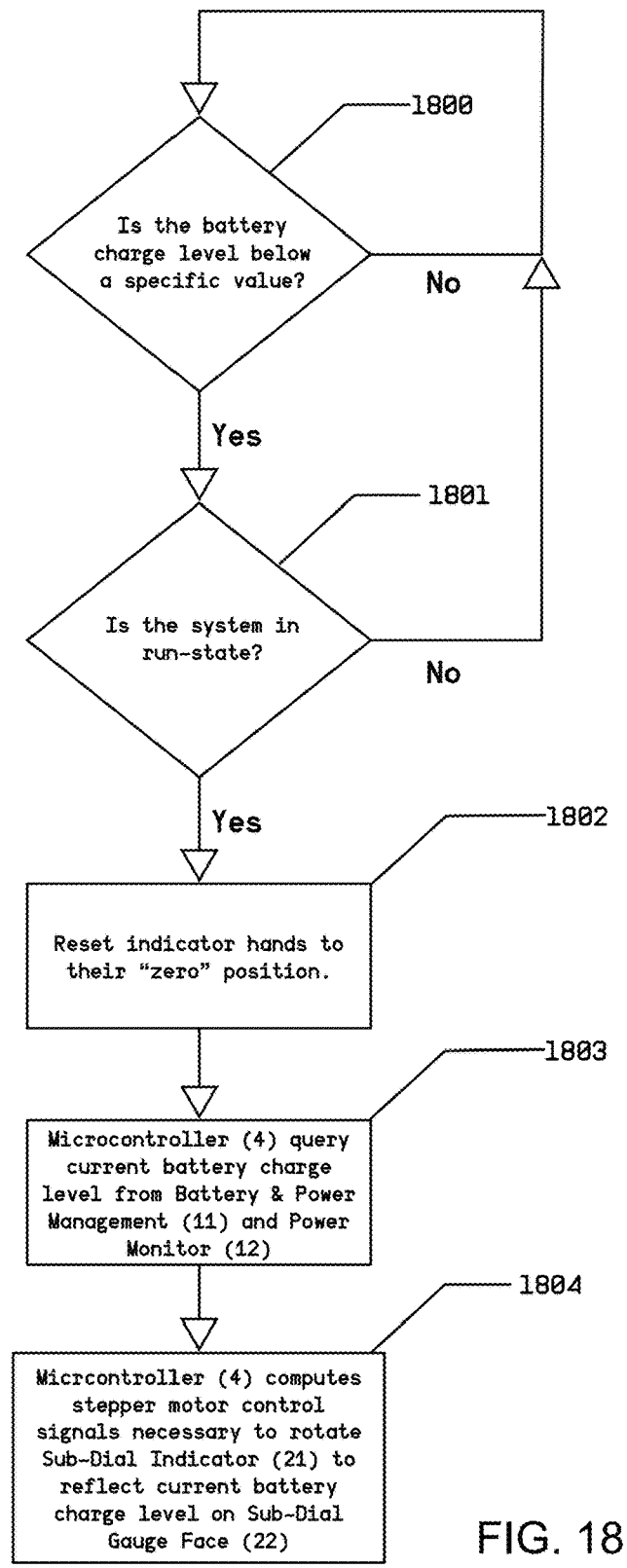
FIG. 18 is a flowchart illustrating an example process for stepper motor control to represent low available battery power state in which an existing dial face and corresponding dial indication hand is overloaded in its functionality while the bicycle computer in a state in which it indicates low available battery power in accordance with one embodiment.

To indicate velocity on Dial Gauge Face (1), Microcontroller (4) may communicate with Stepper Motor Controller (3) in order to step and rotate Stepper Motor (2) by computing the appropriate number of steps so that mechanical Dial Gauge Indicator (14) indicates velocity as computed by the Microcontroller (4) and data communicated by GPS (9). Dial Gauge Face (1) may be used to indicate velocity via Dial Gauge Indicator (15), which is mechanically affixed to one of Stepper Motors (2). It is noted that FIG. 18 is a flowchart that describes one example process for computing stepper motor control instructions to position the velocity indicator hand to represent average velocity. In addition, FIG. 25 is a flowchart that describes one example process for computing stepper motor control instructions to position the velocity hand to represent velocity.

GPS (9) is connected to internal GPS Antenna (ANT) (13), together both are designed and configured to communicate with GPS satellite systems. Bluetooth/ANT+ Module (15) is connected to internal Bluetooth/ANT+ Antenna (23), together both are designed and configured to communicate with Bluetooth/ANT+ devices, sensors and systems. Microcontroller (4) may also be connected via Data Bus (5) to a variety of additional sensors such as a BPS (8) (a barometric pressure sensor), IMU (7) (an inertial measurement unit), Bluetooth/ANT+ Module (15) and serial port USB-C (6).

Figure 2:
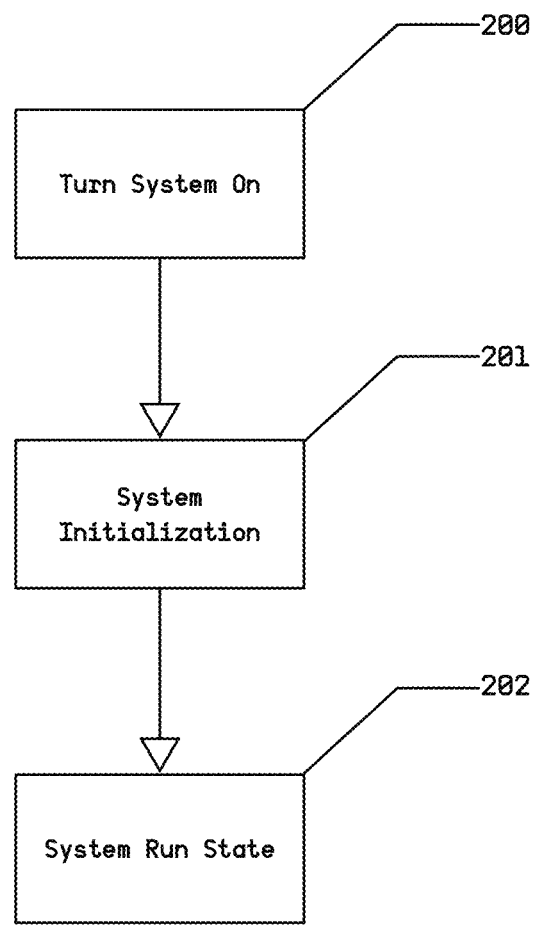
FIG. 2 is a flowchart illustrating one example process (or method) by which the bicycle computer may operate in accordance with one embodiment.

FIGS. 2-11 include description of processes that may be embodied as instructions, which may be stored on a memory (e.g., flash memory) and executed through the Microcontroller (4) that may be on the printed circuit board. Turning to FIG. 2, illustrated is a flowchart for one example method of operation. At step 200 the system is powered on. At step 201, the system initializes itself. (Further described by FIG. 3.) At step 202, the system enters the System Run State in which data from GPS (9) and the various sensors are displayed using gauge-type display and its associated indicators. Microcontroller (3) receives data from the sensors represented in FIG. 1 and computes appropriate Stepper Motor Controller (3) control inputs in order to displace the plurality of Stepper Motors (2) in order position Dial Gauge Indicators (14, 20) and Sub-Dial Indicators (18, 21) to represent sensor data as appropriate to the current system state, e.g. run state, low-power state and other system states.

Figure 3:
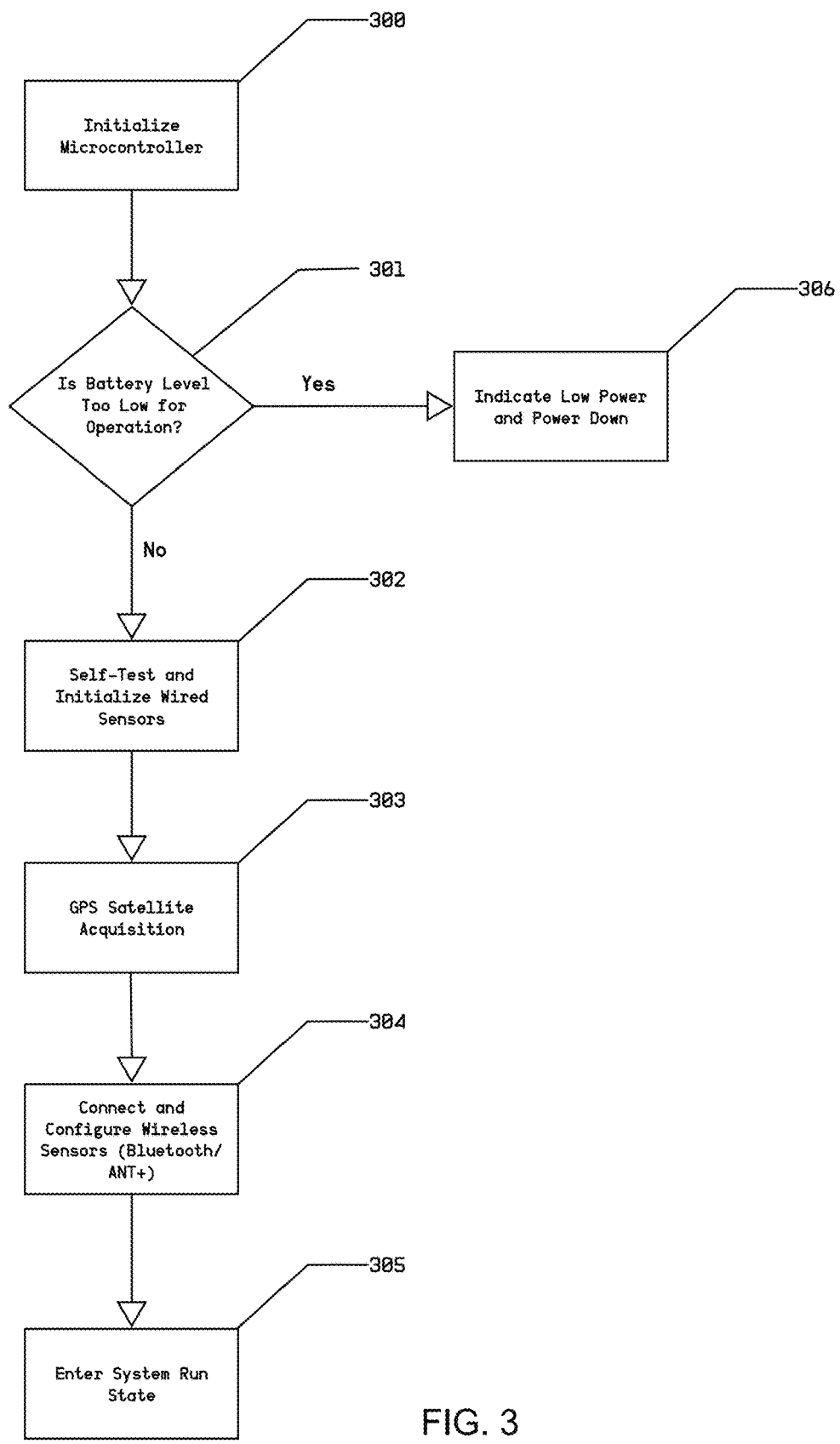
FIG. 3 is a flowchart illustrating one example process for system initialization in accordance with one embodiment.

FIG. 3 is a flowchart describing System Initialization. System initialization starts with step 300 in which the microcontroller initializes itself, checks its integrity, initializes variables necessary for subsequent computation and initializes Power Monitor (11). At step 301 the microcontroller checks the current battery capacity using Power Monitor (11). In the case the battery capacity is below a pre-determined threshold, step 306 is acted upon in which case the system indicates low battery by a series of semaphore motions of specific indicator hands, after which the system powers itself down. If battery capacity is above a pre-determined threshold, step 302 is acted upon which may include checking the state of the main system and sub-systems, actuating stepper motors to ensure their operation, indicating current battery capacity, initializing BPS (8), initializing IMU (7), initializing and integrity-checking Memory (16), initializing Bluetooth/ANT+ Module (15). At step 303 GPS (9) is initialized (further described in FIG. 4). At step 304 the Bluetooth/ANT+ Module (15) is initialized and begins scanning for any available previously configured External Bluetooth/ANT+ Devices, and connects to them. At step 305 the system enters the System Run State in which data from, but not limited to, the GPS (9), BPS (8), IMU (7), Bluetooth/ANT+ Module (15) is represented using the gauge-type display and its associated indicators.

Figure 4:
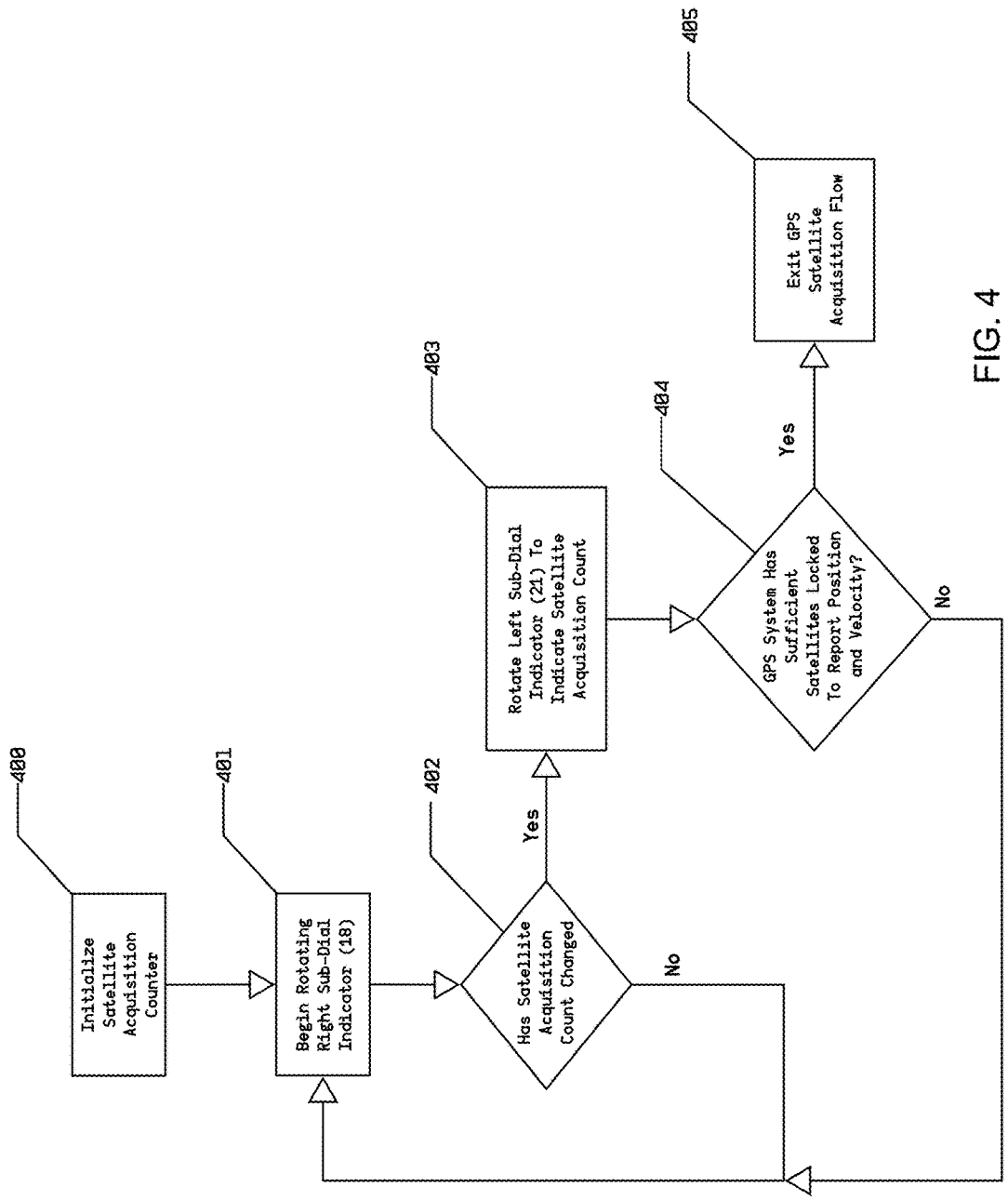
FIG. 4 is a flowchart illustrating one example process global positioning system (GPS) satellite acquisition sequence in accordance with one embodiment.

FIG. 4 is a flowchart describing an example process for GPS Satellite Acquisition. In step 400 a counter indicating the number of satellites successfully acquired and locked onto is initialized to 0. At step 401 the Sub-Dial Indicator (18) begins rotating in a complete turn to indicate the system is searching for satellites. At step 402 and simultaneous to step 401 if the GPS (8) has not acquired or lost one or more satellites, the flow branches back to step 401 and continues to acquire satellites. If at step 402 the GPS (9) has acquired or lost one or more satellites, step 403 is acted upon. At step 403, Sub-Dial Indicator (11) is rotated to indicate the current cardinal number of successfully acquired satellites. At step 404 the system makes a determination based on both the count of satellites and the integrity and precision of the satellites acquired whether there are sufficient satellites to begin capturing velocity and location data. If the determination is that there are sufficient satellites, step 405 is acted upon and the system exits GPS Satellite Acquisition, and returns Sub-Dial Indicator (18) and Sub-Dial Indicator (11) to the positions representing their current data. If the determination is that there are not sufficient satellites, the system branches to step 401 to continue the acquisition of satellites.

Figure 5:
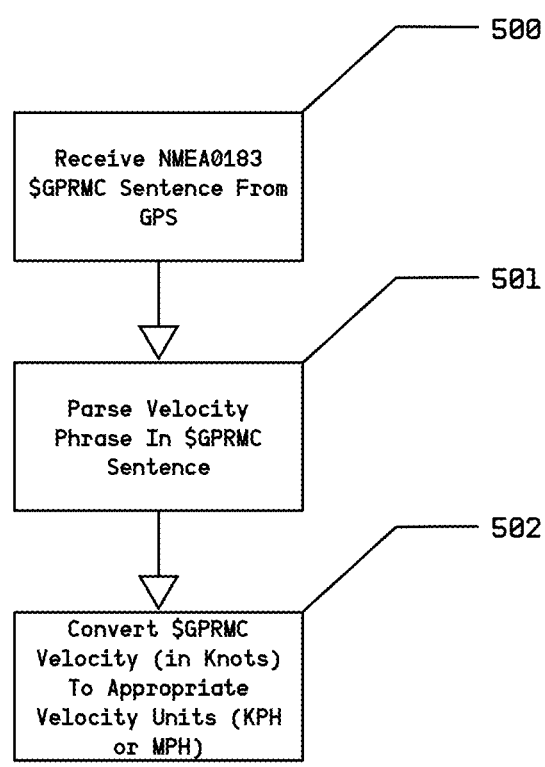
FIG. 5 is a flowchart illustrating an example process for retrieving current velocity from a GPS system in accordance with one embodiment.

FIG. 5 is a flowchart illustrating one example method of retrieving current velocity from the GPS system. In step 500 the Microcontroller (4) receives a standard NMEA0183 $GPRMC sentence from GPS (9). This standard sentence contains current velocity information represented as Knots. In step 501 velocity information is parsed out of the $GPRMC sentence by Microcontroller (4) which subsequently in step 503 converts the velocity from Knots to the velocity appropriate to the units represented on Dial Gauge Face (1) which may be some other unit of velocity such as, for example, miles-per-hour or kilometers-per-hour.

Figure 6:
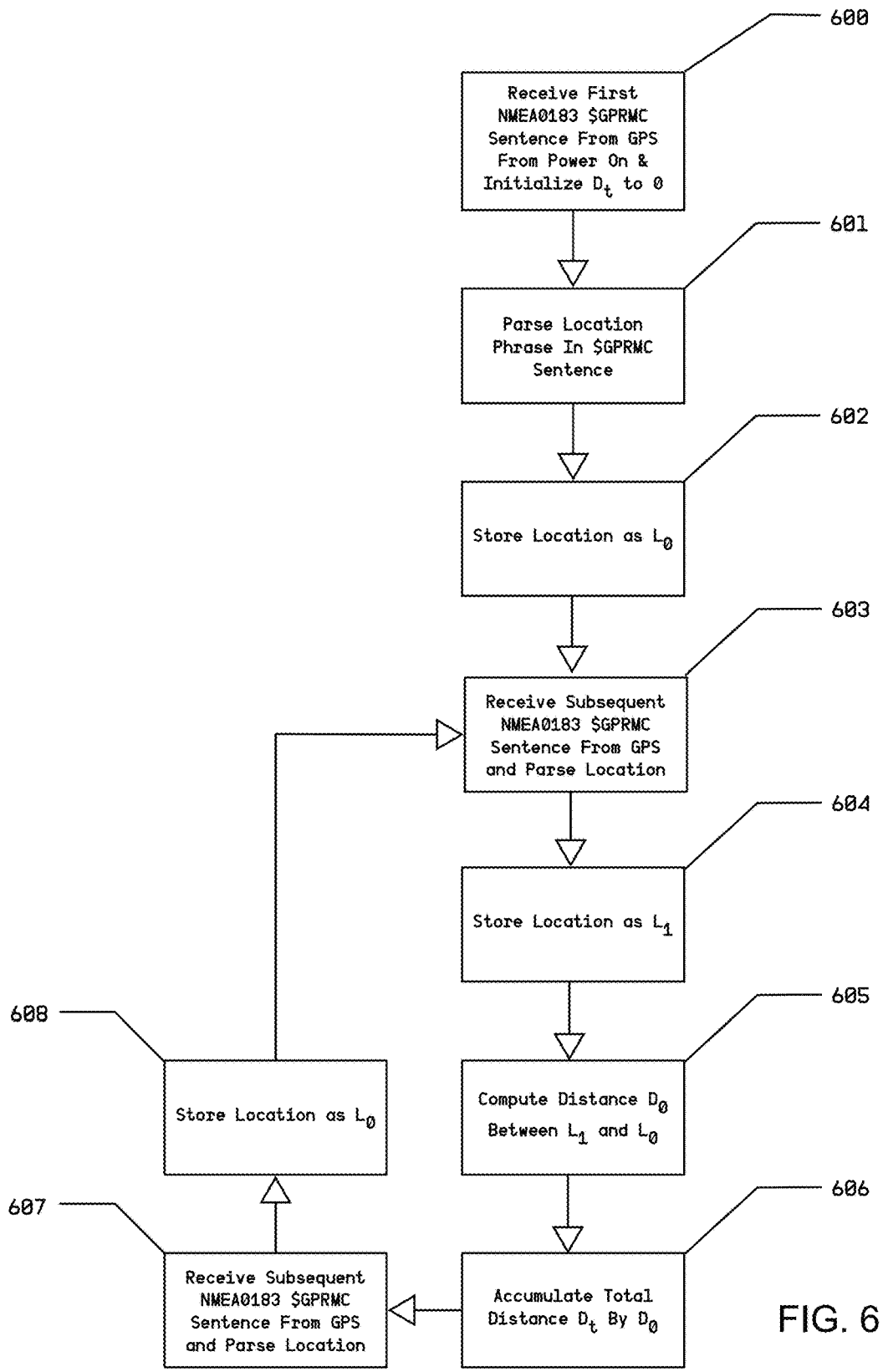
FIG. 6 is a flowchart illustrating an example process for computing total traveled distance in accordance with one embodiment.

FIG. 6 is a flowchart illustrating one example method of Computing Total Traveled Distance. In step 600 Microcontroller (4) receives the first standard NMEA0183 $GPRMC sentence from GPS (9) and initializes $D_t$ to 0, which represents total distance traveled. This standard sentence contains the current location represented as a latitude & longitude pair. At step 601 the location information in the $GPRMC sentence is parsed and at step 602 this current location information is saved in temporary variable $L_0$, representing the first location for the activity after GPS. At step 603 the next $GPRMC sentence is received from GPS (9) and parsed for the location information. In step 604 this subsequent location is saved in temporary variable $L_1$ representing the next location after $L_0$. In step 605 the distance between $L_1$ and $L_0$ is computed and stored in temporary variable $D_0$. In step 606 total cumulative distance is computed by accumulating the current total $D_t$ by $D_0$. In step 607 a subsequent $GPRMC sentence is received from GPS (9) by Microcontroller (4) and parsed for the subsequent location. In step 608 the location information from step 607 is stored as $L_0$. The flow then branches to step 603 and the system continues accumulating total distance by computing the distances between two sequential $GPRMC sentences from GPS (9).

Figure 7:
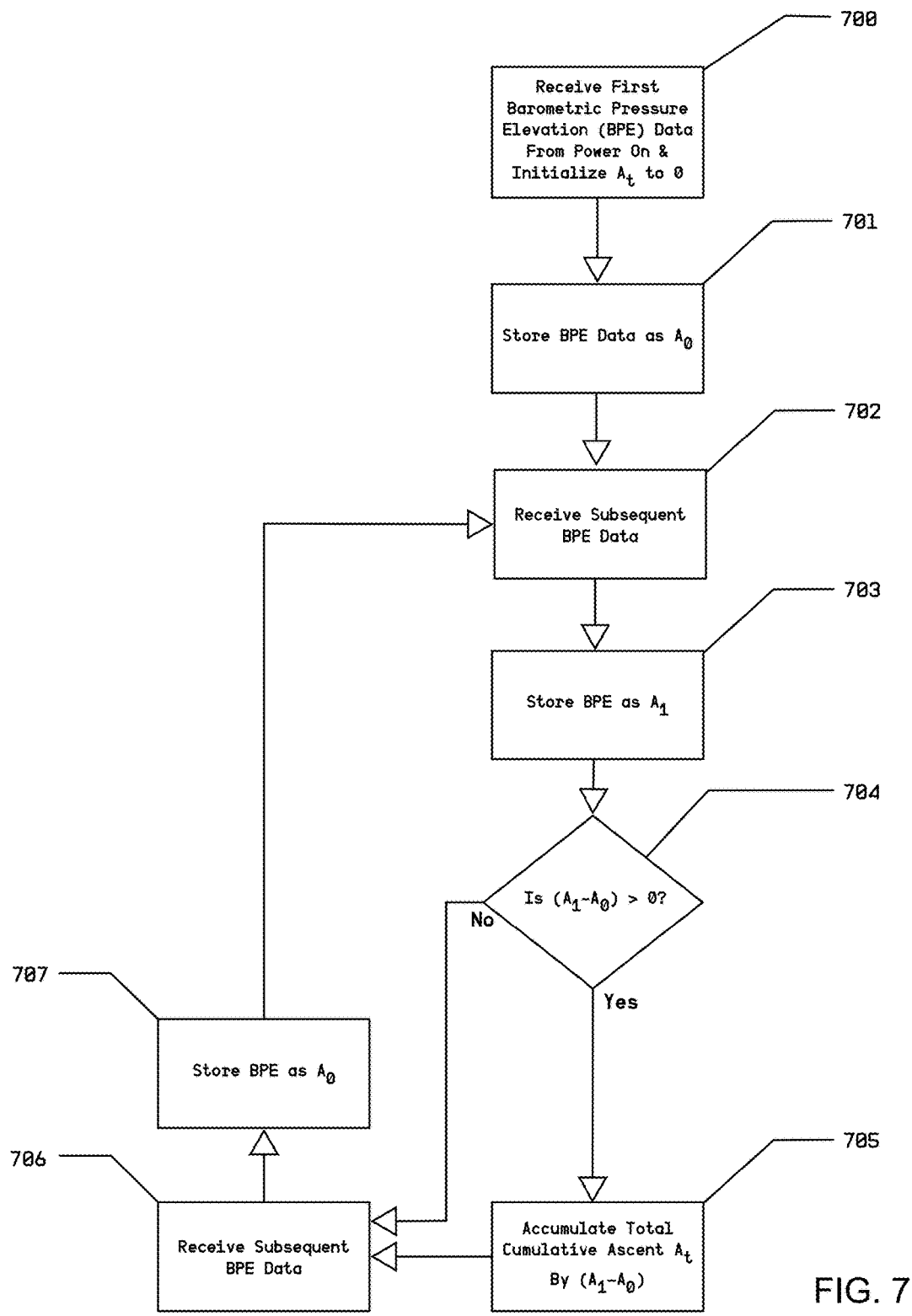
FIG. 7 is a flowchart illustrating an example process for computing total cumulative ascent in accordance with one embodiment.

FIG. 7 is a flowchart illustrating one example method of Computing Total Cumulative Ascent. In step 700 an initial Barometric Pressure Elevation (BPE) reading is communicated from Barometric Pressure Sensor (8) to Microcontroller (4) during system initialization. Initial variable $A_t$ total cumulative ascent is set to 0. In step 701 the initial BPE reading is stored in variable $A_0$. In step 702 a subsequent reading is taken and in step 703 it is stored in variable $A_1$. If in step 704 the difference ($A_1-A_0$) is less than 0, flow moves to step 706. If in step 704 the difference ($A_1-A_0$) is greater than 0, there has been an ascent—an increase in elevation—and step 705 is acted upon in which the difference ($A_1-A_0$) is added to the total cumulative ascent $A_t$. In step 706 a subsequent BPE data is read from Barometric Pressure Sensor (8) to Microcontroller (4). In step 707 the BPE data read in step 706 is stored in $A_0$. Flow then moves to step 702. This loop continues in such a fashion so as to accumulate ascent and compute total cumulative ascent.

Figure 8:
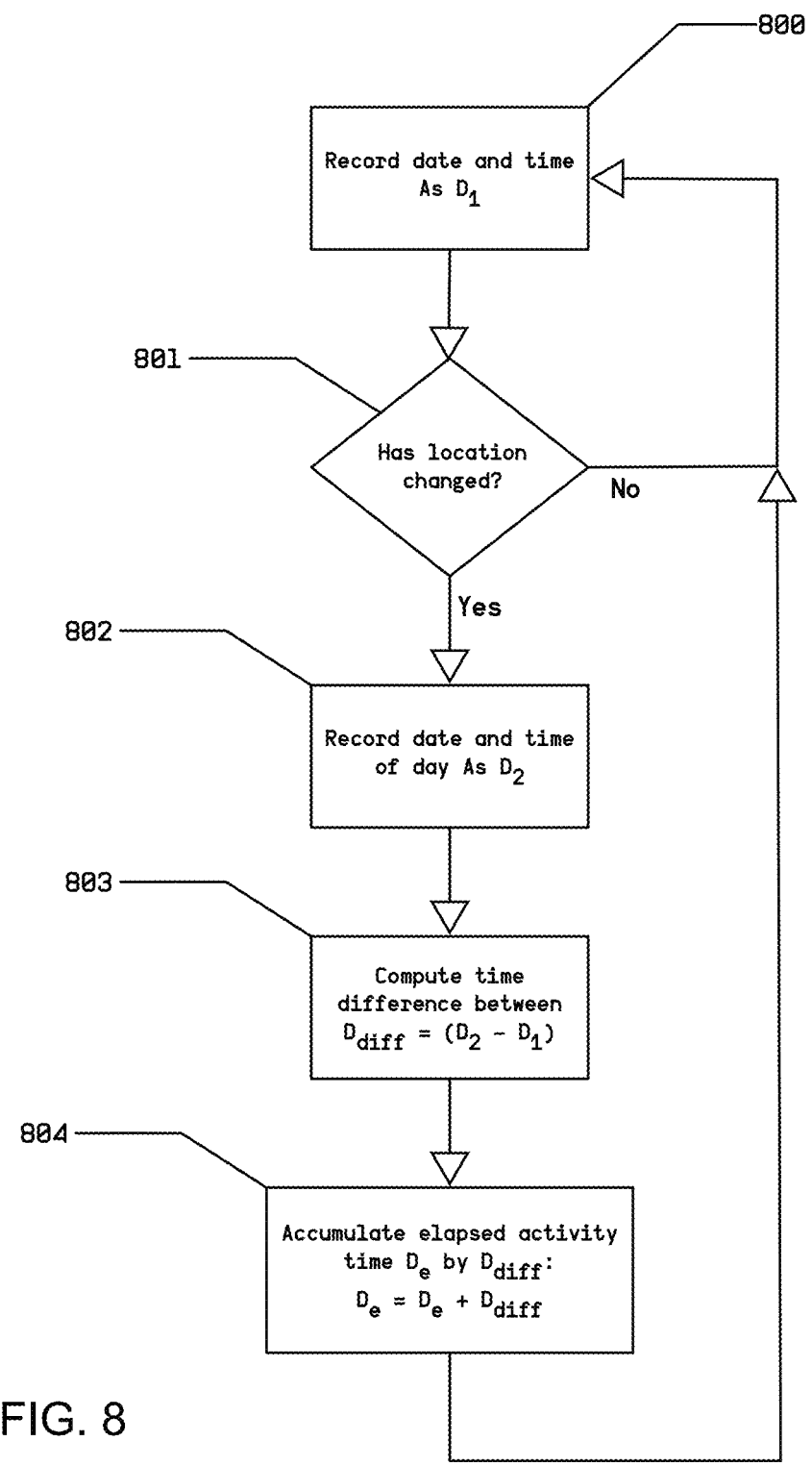
FIG. 8 is a flowchart illustrating an example process for computing elapsed activity time in accordance with one embodiment.

FIG. 8 is a flowchart illustrating one example method of computing elapsed activity time, in which the total time in which change in location is detected is accumulated. In step 800 the current date-time is recorded and stored as $D_1$, which may be in the reference form of milliseconds since a suitable computational epoch. In step 801 a determination is made as to whether there has been a change in location based on the current location indicated by the GPS (9). If the location has not changed, control flow moves to step 800. If the location has changed, control flow moves to step 802 where the current date-time is recorded and stored as $D_2$. In step 803 the time difference is computed between $D_2$ and $D_1$ and stored as $D_{diff}$. In step 804 $D_{diff}$ is added to $D_e$ representing the total elapsed activity time. Control flow returns to step 800.

Figure 9:
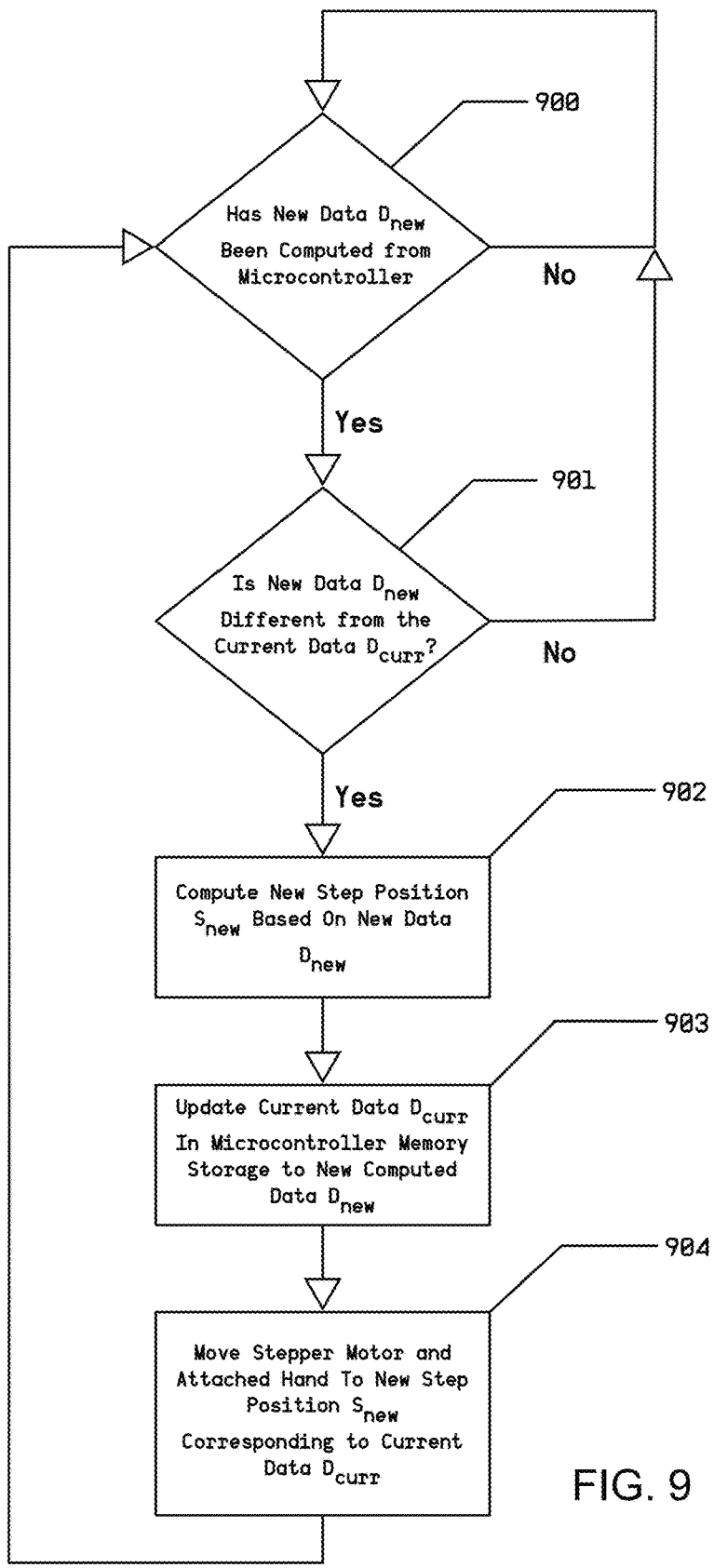
FIG. 9 is a flowchart illustrating am example process for updating the position of a stepper-motor affixed hand that may represent some microcontroller computed data in accordance with one embodiment.

FIG. 9 is a flowchart illustrating an example of a general process regardless of specific type or units of data to be represented when updating the position of a stepper-motor. In step 900 a determination is made as to whether new data $D_{new}$ has been computed by Microcontroller (4). If in step 900 new data has not been computed, flow returns again to step 900. If in step 900 new data has been computed, flow moves to step 901 where a determination is made as to whether that new data $D_{new}$ is different from the previous data $D_{curr}$. If $D_{new}$ is not different from $D_{curr}$, flow returns to step 900. If $D_{new}$ is different from $D_{curr}$, then flow continues to step 902. In step 902, a new position $S_{new}$ is computed for the stepper motor based on new data $D_{new}$. In step 903 $D_{curr}$ is replaced by $D_{new}$. In step 904, stepper motor and attached indicator hand is moved to position $S_{new}$ corresponding to data $D_{curr}$. Flow then returns to step 900.

Figure 10:
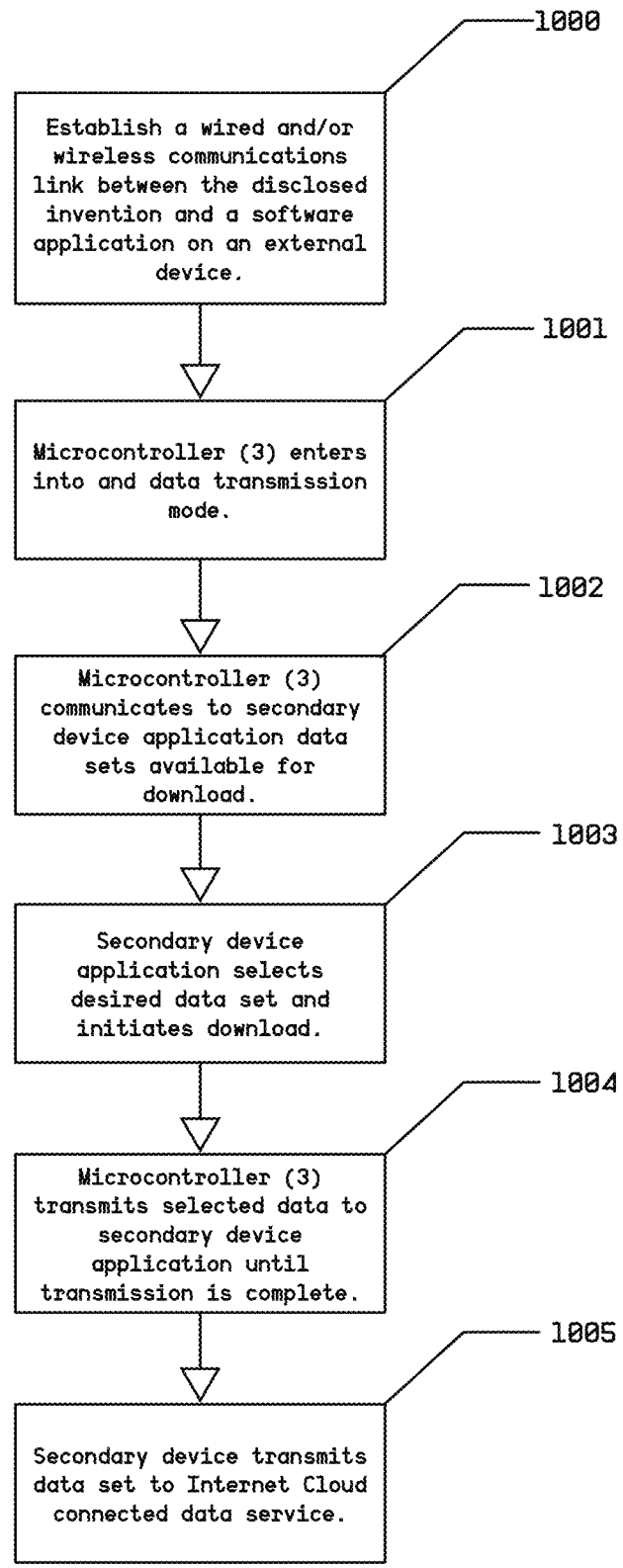
FIG. 10 is a flowchart illustrating an example process for downloading sensor data to an external device over a wired or wireless communications channel (or channels) in accordance with one embodiment.
Figure 11:
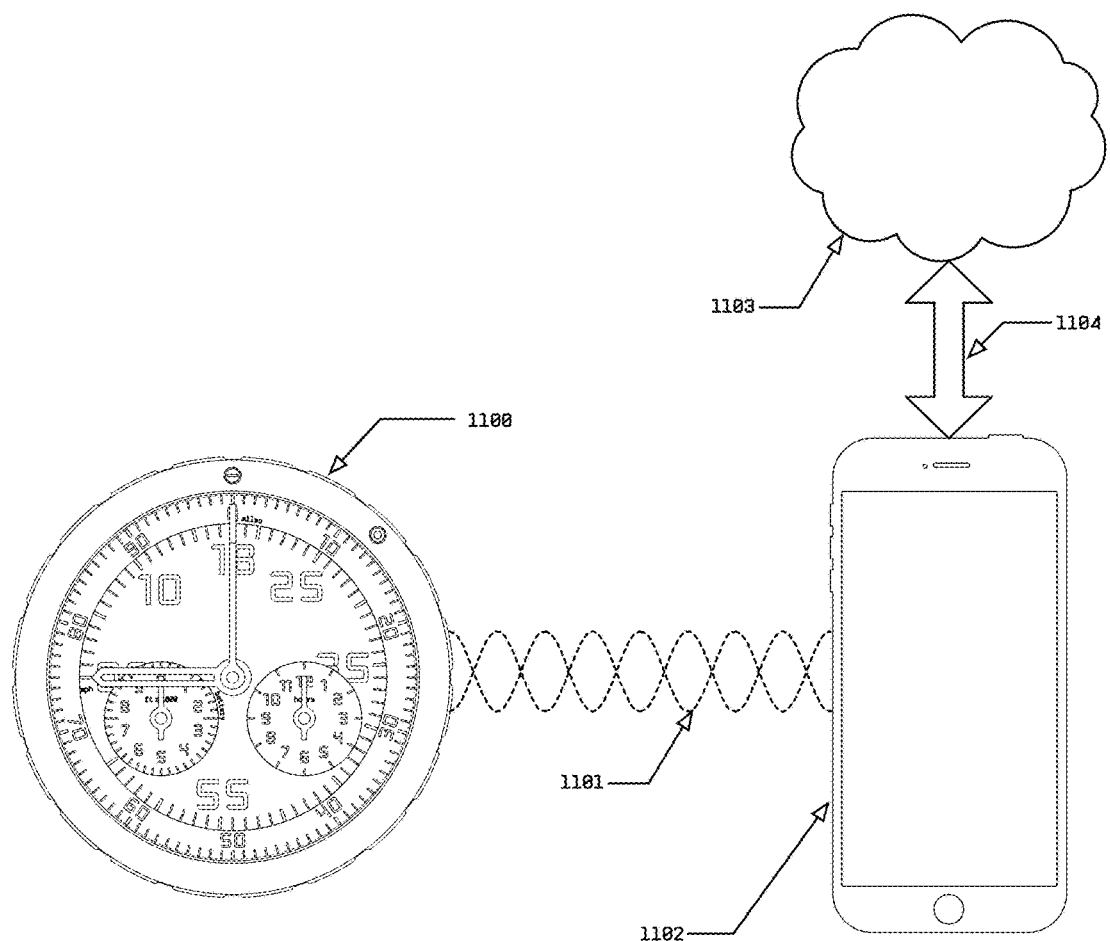
FIG. 11 is a diagram illustrating an example process for downloading sensor data to an external device over wired and/or wireless communications channel (or channels) in accordance with one embodiment.

FIG. 10 is a flowchart illustrating one example method of downloading sensor data to an external device over a wired or wireless communications channel(s). Referring to FIG. 10, FIG. 1 and FIG. 11, in step 1000 a wireless and/or wired communications channel represented as part 1101 in FIG. 11 is established between the bicycle computer represented as part 1100 in FIG. 11 and a software application on an external connected device represented as apparatus 1102 in FIG. 11. In step 1001 Microcontroller (3) enters into a data transmission mode, preparing to communicate internal stored data recorded during operating modes, such as required to represent, for example, GPX (GPS Exchange Format), TCX (Training Center XML) or other format activity data formats. In step 1002 Microcontroller (3) communicates over the established communications channel 1101 to apparatus 1102 transmitting meta information as necessary to establish and maintain the channel. In step 1002 Microcontroller (3) represents over the communications channel the data sets available to download to part 1102. In step 1003 apparatus 1102 selects a data set and initiates download. In step 1004 Microcontroller (3) transmits the selected data set to apparatus 1102 until the transmission is complete. In step 1004 apparatus 1102 may optionally retransmit the data downloaded in step 1103 to an Internet Cloud connected data source represented as part 1103, such as a website for reviewing and analyzing activity data over a standard communications channel, such as, for example, Wi-Fi or cellular data, represented as communications channel 1104.

FIG. 11 is a diagram illustrating one example method of downloading sensor data to an external device over wired and/or wireless communications channel(s) and further describing FIG. 10. Part 1100 is the bicycle computer. Part 1101 is a wireless and/or wired communications channel which may use Bluetooth/ANT+ Module (15) and/or USB-C (6) as represented in FIG. 1. Apparatus 1102 may be a device which may be embodied by a mobile telephone, a smart phone, a companion device, for example, a smart watch, a laptop computer, a tablet computer or the like. The apparatus 1102 may be able to establish, download and transmit the contents of data downloaded from part 1100 over communications channel 1101. Communications channel 1104 represents a link to an Internet Cloud connected data source part 1103, which may be over a standard communications channel such as, for example, Wi-Fi or cellular data.

Figure 12:
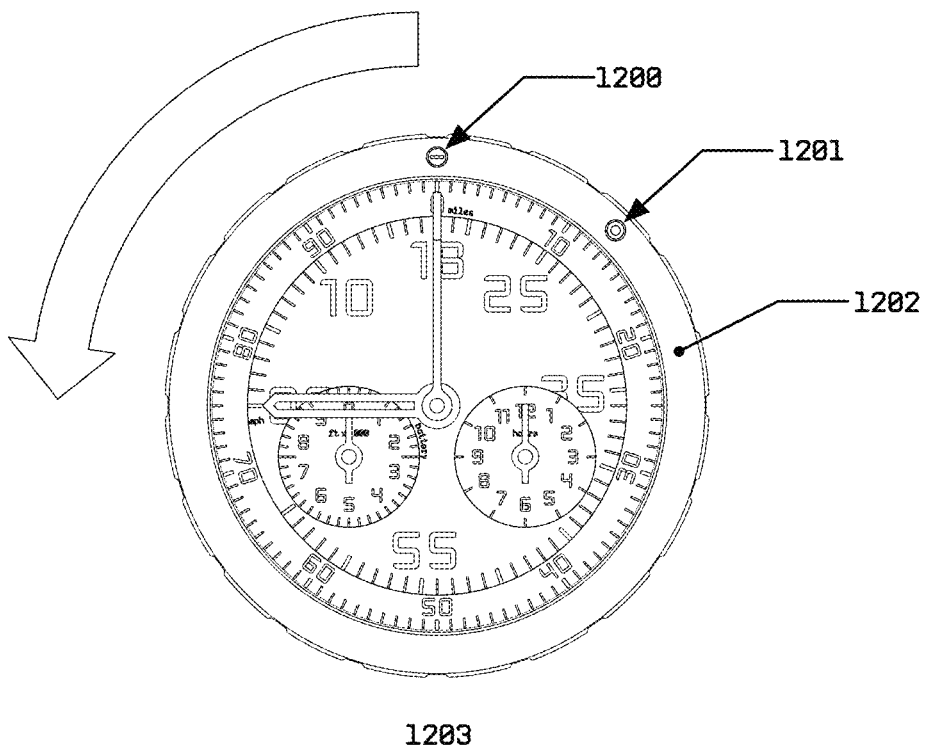
FIG. 12 is a diagram illustrating an example process of turning the bicycle computer on and off in accordance with one embodiment.
Figure 12:
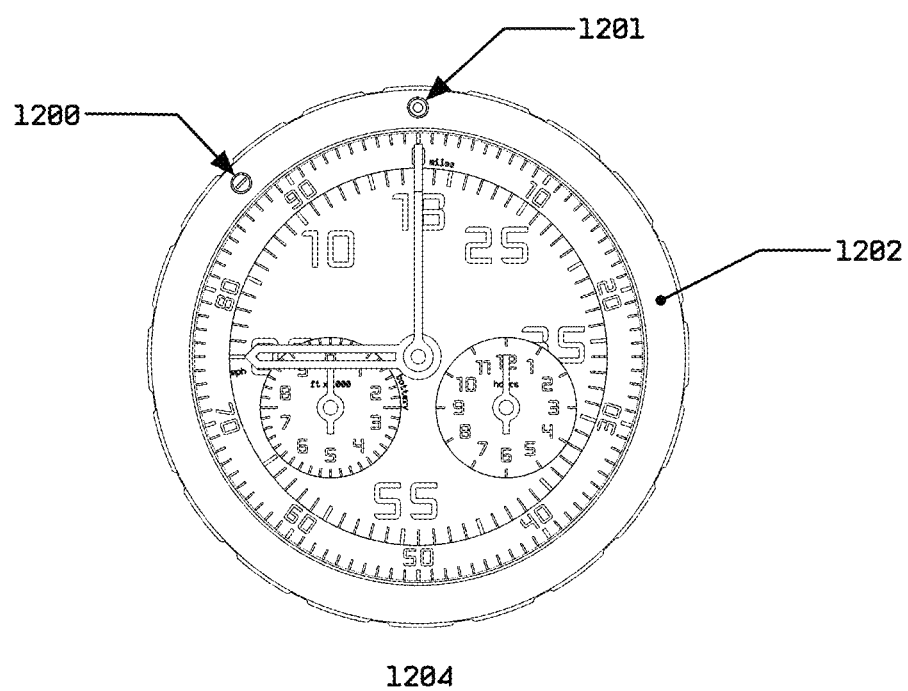

FIG. 12 Diagram illustrating one example method of turning the bicycle computer on and off. A rotating bezel 1202 is structured to bes free to rotate in such a way that its angular position relative to the Dial Gauge Face (1) is tracked by Microcontroller (4) thereby allowing rotation of the rotating bezel 1202 to control state transitions of Microcontroller (4), effectively providing control input to the bicycle computer. The rotating bezel 1202 in the "Off" position 1203, as determined by indicator symbol 1200 representing the "Off" state for the bicycle computer. The "Off" position is clearly indicated when indicator symbol 1200 rests at the top-most location on the rotating bezel. To turn the bicycle computer "On", rotating bezel 1202 is rotated in the direction indicated by the arrow such that indicator symbol 1201 representing the "On" state appears in the top-most position as shown by configuration 1204. Rotation in the opposite direction in such a way to bring symbol 1200 to the top-most position returns the system to the "Off" state. The direction of rotation may be in a different direction than indicated for the state transition between "On" and "Off", and the location of the indicator symbols 1200 and 1201 may be differently located in relationship to each other or in a different location on the perimeter of rotating bezel 1202.

Figure 13:
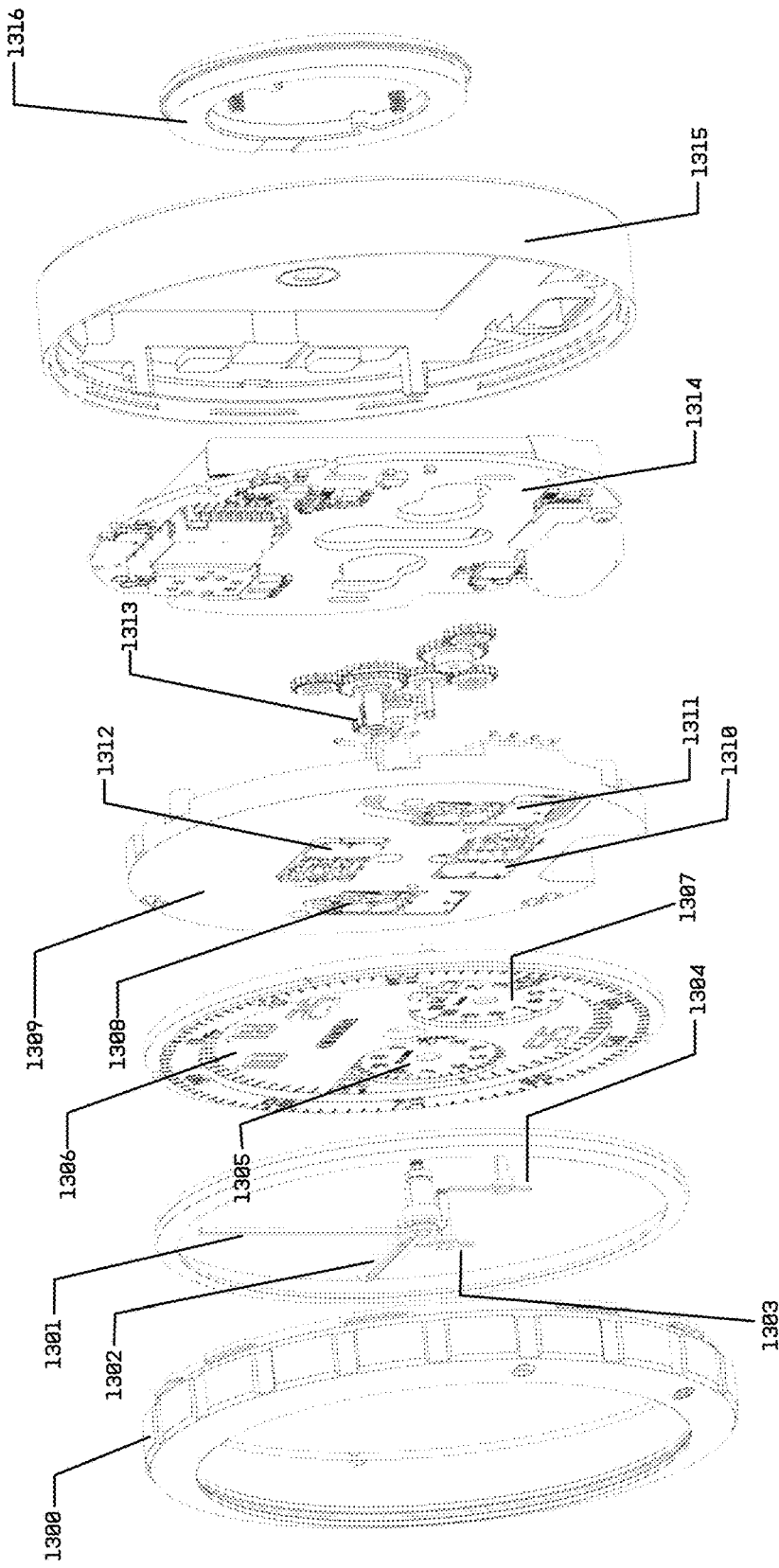
FIG. 13 is a diagram illustrating an exploded view of an example bicycle computer's assembly in accordance with one embodiment.

FIG. 13 is a diagram illustrating an example of a possible exploded view of a bicycle computer assembly. A rotating bezel 1300 functionality is represented in FIG. 11. An indicator hand 1301 was represented in FIG. 1 as Dial Gauge Indicator (14). A indicator hand 1302 was represented in FIG. 1 as Dial Gauge Indicator (20). An indicator hand 1303 was represented in FIG. 1 as Sub-Dial Indicator (21). An indicator hand 1304 was represented in FIG. 1 as Sub-Dial Indicator (18). A dial gauge face 1306 was represented in FIG. 1 as Dial Gauge Face (1). A sub-dial gauge face 1305 was represented in FIG. 1 as Sub-Dial Gauge Face (22). A sub-dial gauge face 1307 was represented in FIG. 1 as Sub-Dial Gauge Face (19).

Stepper motors 1308, 1310, 1311, 1312 are configured to be mechanically fixed to their corresponding indicator hands via an arrangement of gears 1313. A sub-assembly 1309 contains and fixes stepper motors 1308, 1310, 1311, 1312 and the arrangement of gears 1313. A printed circuit board 1314 is configured to contain the electrical circuits of the bicycle computer, including but not limited to the components represented in FIG. 1.

The assembly of the housing in includes a main rear 1315 portion. A mounting boss 1316 with which the bicycle computer may be attached to a bracket or other mechanical fixture may secure the assembly at an appropriate location on a bicycle, such as a handlebar.

Figure 14:
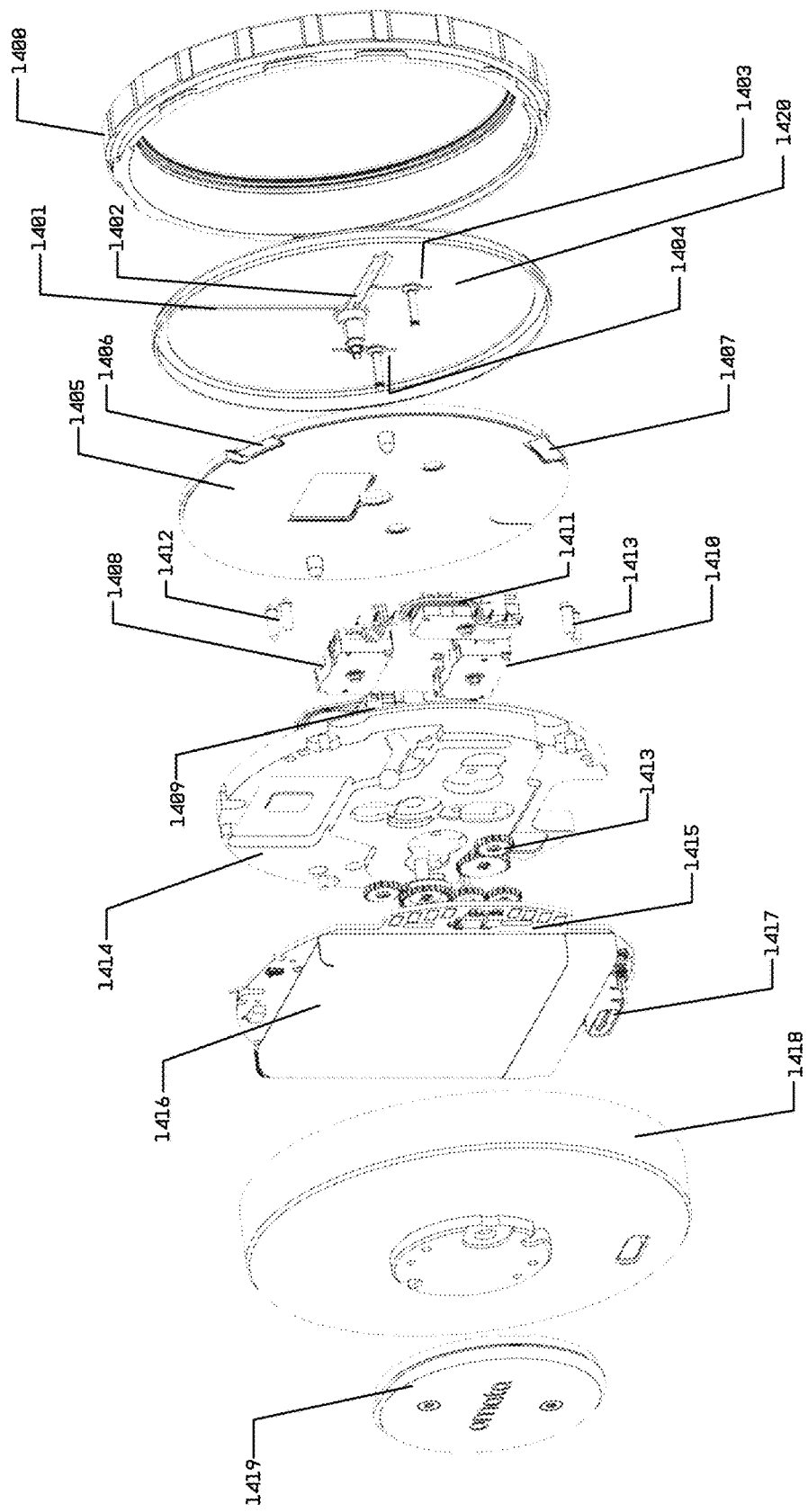
FIG. 14 is a diagram illustrating an additional view of an exploded view of an example bicycle computer assembly in accordance with one embodiment.

FIG. 14 is a diagram illustrating an example of a possible exploded view of the bicycle computer assembly. In reference to FIG. 13, FIG. 14 reveals additional details as best seen with the bottom of the bicycle computer in the near field outwards towards the top of the bicycle computer in the far field of a perspective illustration. A rotating bezel 1400 is structured with functionality as represented in FIG. 11. An indicator hand 1401 may be represented in FIG. 1 as Dial Gauge Indicator (14). An indicator hand 1402 may be represented in FIG. 1 as Dial Gauge Indicator (20). An indicator hand 1403 may be represented in FIG. 1 as Sub-Dial Indicator (21). An indicator hand 1404 may be represented in FIG. 1 as Sub-Dial Indicator (18). A dial gauge face 1405 may be represented in FIG. 1 as Dial Gauge Face (1) and represented in FIG. 13 as the dial gauge face 1306. The dial gauge face 1405 may have a top and a bottom. The top of the dial gauge face 1405 may have visual markings, e.g., numbers and/or letters for display.

Also shown in FIG. 14 is a motor frame assembly 1414. The motor frame assembly is a mechanical structure that contains and supports the stepper motors, gears, pinions, and dial gauge indicator hand shafts. It also includes components to route a universal serial board (USB) flex that connects stepper motors 1408, 1409, 1410, 1411 to a printed circuit board (PCB) 1415.

By way of example a stepper motor 1411 also may be represented as stepper motor 1310 in FIG. 13. It may be a sub-assembly that contains and fixes stepper motors 1408, 1409, 1410, 1411 and the arrangement of gears 1413, which mechanically fix each of the stepper motors' main movements to Dial Gauge Indicators 1401 and 1402, and Sub-Dial Indicators 1403 and 1404. An exposed section of the GPS Antenna 1406 may be represented in FIG. 1 as GPS Antenna (13).

A printed circuit board 1415 may contain the electrical circuits of the bicycle computer, including but not limited to the components represented in FIG. 1. A battery 1416 for the bicycle computer may be represented in FIG. 1 in a component of Battery and Power Management (12). A serial port connector 1417 may be represented in FIG. 1 as USB-C (6).

A main rear portion of the housing also is shown for the entire assembly. The rear portion of the housing may have a rear cover (which is has a stubbed cylindrical configuration) 1418 and a mounting boss 1419. The mounting boss 1419 may be structured to attach the bicycle computer to a bracket or other mechanical fixture so as to secure it at an appropriate location on a bicycle, such as a handlebar.

Continuing the detailed description of FIG. 14, GPS Antenna part (or portion or segment) 1406 is embedded within a mechanical slot in dial gauge face 1405. It may be partially obscured in FIG. 14. The exposed portion of GPS Antenna part 1406 provides an electrical-mechanical interface to electrically-conductive pogo pins 1412 through sub-assembly 1410 to printed circuit board 1415. Dial gauge face 1405 provides a performant location in the bicycle computer for GPS Antenna Part 1406, because dial gauge face 1405 is situated closer to the sky with no significant additional RF performance degradation based on not-fully RF transparent hard parts above it in the assembly stack-up. Situated within dial gauge face 1405, the RF sensitivity and performance of the GPS Antenna part 1406 provides quicker first signal lock for the GPS system, and more robust RF performance as external environmental conditions such as weather and overhead obstructions change. Additionally, this location within dial gauge face 1405 for GPS Antenna part 1406 is less obscured to the external RF environment by the main rear portion 1408 of the housing for the entire assembly.

An exposed section of the Bluetooth/ANT+ Antenna 1407 was represented in FIG. 1 as Bluetooth/ANT+ Antenna (23). Bluetooth/ANT+ Antenna 1407 also may be embedded within a slot within dial gauge face 1405. This second slot may be some distance from the first slot so as to prevent interference issues between the antennas. For example, the first slot may be 180 degrees from the second slot or at a 120 degree angle from the second slot.

The exposed portion of Bluetooth/ANT+ Antenna 1407 provides an electrical-mechanical interface to electrically-conductive pogo pins 1413 through sub-assembly 1410 to printed circuit board 1415. Bluetooth/ANT+ Antenna 1407 is positioned largely embedded within a mechanical slot in dial gauge face 1405. Dial gauge face 1405 provides a most performant location in the bicycle computer for Bluetooth/ANT+ Antenna 1407, because dial gauge face 1405 is situated closer to the environment external to the bicycle computer and thence to any proximate Bluetooth/ANT+ networks and devices with no significant additional RF performance degradation based on not-fully RF transparent hard parts above it in the assembly stack-up. Additionally, this location within dial gauge face 1405 for Bluetooth/ANT+ Antenna 1407 is less obscured to the external RF environment by the main rear cover 1418 of the housing for the entire assembly. In an additional possible assembly, GPS Antenna part 1406 and/or Bluetooth/ANT+ Antenna 1407 may be located further up in the assembly stack-up, such as at or within rotating bezel 1400, at or within a transparent cover 1420. The transparent cover 1420 may be a protective optically transparent material that mechanically protects dial gauge face 1405, at or within Dial Gauge Indicators 1401 and 1402, at or within Sub-Dial Indicators 1403 and 1404.

The antenna configuration, unlike conventional configurations provides a number of benefits and advantages. Placement of the antennas (1406, 1407) may be, for example, a portion within the slots of the dial gauge face 1405 and a portion may be immediately below the face 1405. The portion of the antennas 1406, 1407 below the dial gauge face 1405 may be coupled to the bottom of the dial gauge face 1405. Conventional GPS speedometers with digital displays cannot place the antenna below their display and place them in some adjoining area outside of the display region. An advantage of this configuration is a contained geometry that does not require additional face surface area to accommodate antennas. Moreover, the configuration overcomes the problem of potential interference from stepper motors 1308, 1310, 1311, 1312. By moving the antennas off of the printed circuit board 1415 the antennas may be structured internal as opposed to external to the device itself. This configuration allows for signal efficiency. Other gauge-type devices typically place the antenna externally (attached via a cable) or otherwise outside of the device operational components. By structuring the antenna as disclosed, the antenna is optimized in view of issues presented by the electro-magnetic energy of the stepper motors and the PCB, while providing sufficient length and overall geometry to be efficient.

Figure 15:
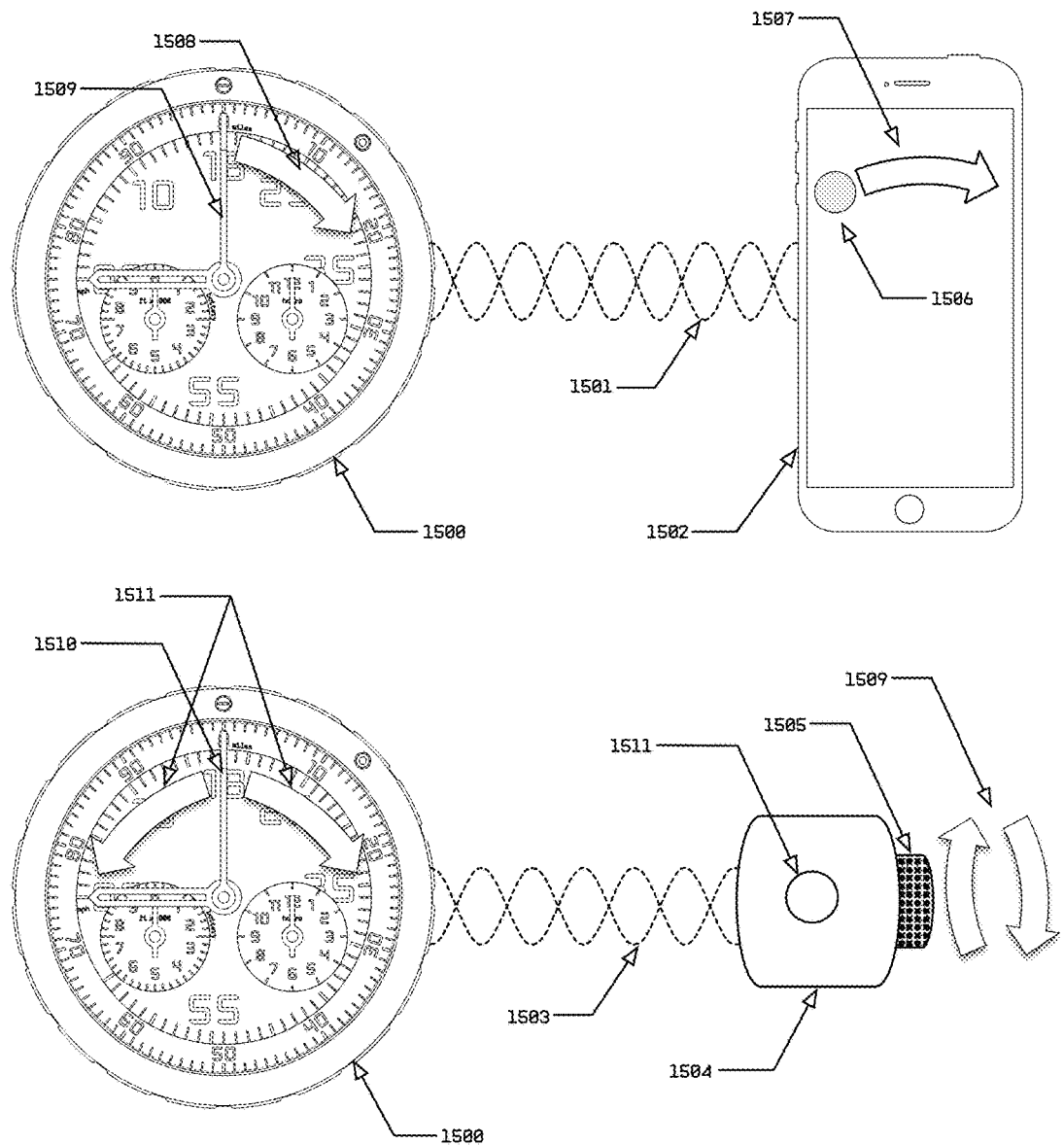
FIG. 15 is a diagram illustrating example processes of calibrating the dial indicators in accordance with one embodiment.

FIGS. 15-24 include description of processes that may be embodied as instructions, which may be stored on a memory (e.g., flash memory) and executed through the Microcontroller (4) that may be on the printed circuit board 1415. Turning first to FIG. 15, illustrated is a diagram illustrating two example methods of calibrating the dial indicator hands. Referring also to FIG. 1, represents the bicycle computer 1500, which may be connected over a wired or wireless communication link 1501 to an apparatus 1502 which may be a mobile telephone, a smart phone, a companion device, for example, a smart watch, a laptop computer, a tablet computer or the like in order to facilitate calibration of the dial indicator hands, configuring, adjusting and otherwise managing the internal state of the bicycle computer via some method such as a computer program or application operating on apparatus 1502 which has a control input 1506 and 1507 such as swiping, rotation, direct control in a screen-based user interface. The action of control input 1506 and 1507 would be to direct the Microcontroller (4) of part 1500 to send control signals to Stepper Motor Controller (3) in order to step and rotate Stepper Motor (2) in synchrony with the aforementioned control input 1506 and 1507. Control input 1506 and 1507 may be specifically to manipulate through Microcontroller (4) stepper motor control signals singly or in a plurality to specific stepper motor(s) depending on the users desire to calibrate one or more dial or sub-dial indicator hands. In FIG. 15, as an example, is illustrated calibrating Dial Gauge Indicator (14) indicated as part 1509 by its rotation in synchrony with control input 1507 in the direction indicated by arrow 1508.

Again referring to FIG. 1 and FIG. 15, is a further example of calibrating the dial indicator hands in which part 1504 represents an apparatus which may be connected over a wired or wireless communication link 1503. The apparatus may be a mobile telephone, a smart phone, a companion device, for example, a smart watch, a laptop computer, a tablet computer or the like. The apparatus may be fitted with a control input element 1505 which may be a touch surface, switch, rotatable dial or combination of these input elements which allows for control input by its manipulation as, for example, swiping, rotation, pushing directional selection including up, down, right and left buttons. In the manipulation of control input element 1505, calibration of dial indicator hands and otherwise configuring, adjusting and managing the internal state of the bicycle computer is facilitated. Control input 1505 might, for example, be a rotating dial with integral pushbutton such that rotating the dial clockwise or counter-clockwise as indicated by arrows 1509 sends appropriate signals to Microcontroller (4) over communication link 1503 such that one dial indicator hand rotates in synchrony with the rotation of control input 1505 as indicated by arrows 1511. Pushing control input 1512 which may, for example, be a mechanical pushbutton or other signaling control element such as a touch target on a touchscreen, or an integrated pushbutton as a component of control input 1505 would select the next in a rotating queue specifying which dial or sub-dial indicator hand should be next manipulated.

Figure 16:
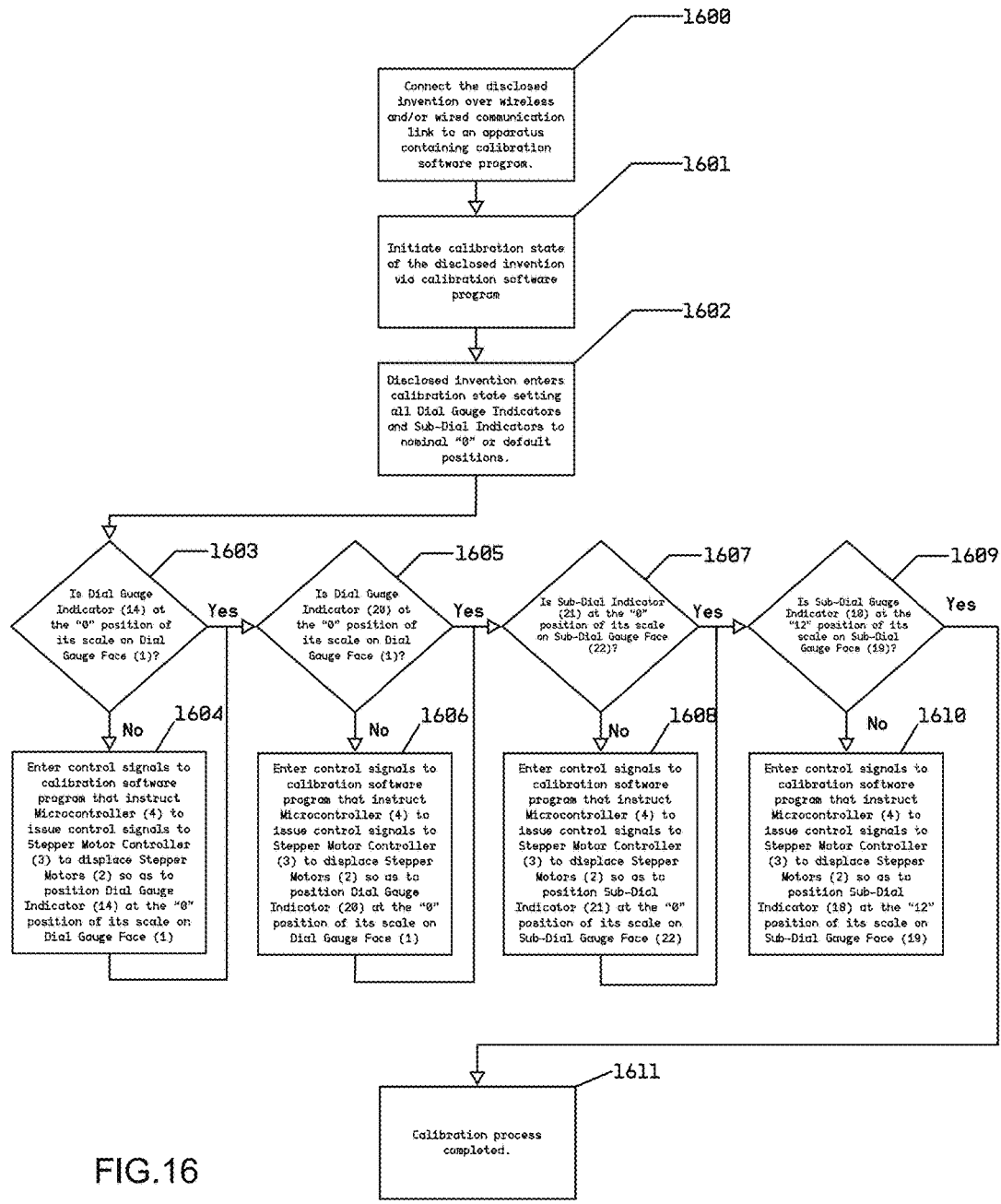
FIG. 16 is a flowchart illustrating an example process for system calibration in accordance with one embodiment.

FIG. 16 is a flowchart illustrating one example process for calibrating the dial indicators and may represent the process for calibration diagrammed in FIG. 15. In some circumstances it may be desirable to adjust the indicator hands to account for any misalignment that may result from extended use of the bicycle computer. Calibration of the dial indicators may result in aligning the hands such that each particular indicator hand points accurately to its neutral position on its respective dial when the bicycle computer is in a neutral (non-active) state. The process may be seen as analogous to setting the hands of an analog clock to a specific time at that specific time of day so as to maintain an accurate representation of the time as indicated by the hands of the analog clock.

Referring again to FIG. 16 and FIG. 1, in step 1600 the bicycle computer establishes a wireless and/or wired communication link to an apparatus containing a calibration software program. In step 1601 the bicycle computer initiates the calibration state, exiting any previous state it may have been in. In step 1602 the bicycle computer enters the calibration state setting all Dial Gauge Indicators (14, 20) and Sub-Dial Indicators (18, 21) to their nominal "0" or default positions.

Referring to FIG. 1 and Dial Gauge Face (1), the nominal "0" position of Dial Gauge Indicator (20) is at the position of the printed "0" at a 9 o'clock face position on the innermost scale representing that there is no velocity; the nominal "0" position of Dial Gauge Indicator (14) is at the position of the printed "0" on the outermost scale representing that no distance has been traveled. Referring to FIG. 1 and Sub-Dial Gauge Face (22), the nominal "0" position of Sub-Dial Indicator (21) is at the position of the printed "0" of Sub-Dial Gauge Face (22) at a 12 o'clock position and represents that no vertical ascent has been achieved. Referring to FIG. 1 and Sub-Dial Gauge Face (19), the nominal "0" position of Sub-Dial Indicator (18) is at the position of the printed "12" at the 12 o'clock position of Sub-Dial Gauge Face (19) and represents that no time has elapsed.

In step 1603 a user manipulating the calibration software program on the connected apparatus would make a determination based on visual inspection as to whether Dial Gauge Indicator (14) is at its "0" position on its scale on Dial Gauge Face (1). If it is, flow moves to step 1605. If it is not, through the user's manipulation of the calibration software program's user interface, the calibration software program signals instructions to Microcontroller (4) over the wireless and/or wired communications link to issue control signals to Stepper Motor Controller (3) to displace Stepper Motors (2) so as to position Dial Gauge Indicator (14) at the "0" position of its scale on Dial Gauge Face (1).

The process continues to step 1605 in which the user manipulating the calibration software program on the connected apparatus may make a determination based on visual inspection as to whether Dial Gauge Indicator (20) is at its "0" position on its scale on Dial Gauge Face (1). If it is, flow moves to step 1607. If it is not, through the user's manipulation of the calibration software program's user interface, the calibration software program signals instructions to Microcontroller (4) over the wireless and/or wired communications link to issue control signals to Stepper Motor Controller (3) to displace Stepper Motors (2) so as to position Dial Gauge Indicator (20) at the "0" position of its scale on Dial Gauge Face (1).

The process continues to step 1607 in which the user manipulating the calibration software program on the connected apparatus may make a determination based on visual inspection as to whether Sub-Dial Indicator (21) is at its "0" position on its scale on Sub-Dial Gauge Face (22). If it is, flow moves to step 1609. If it is not, through the users manipulation of the calibration software program's user interface, the calibration software program signals instructions to Microcontroller (4) over the wireless and/or wired communications link to issue control signals to Stepper Motor Controller (3) to displace Stepper Motors (2) so as to position Sub-Dial Indicator (21) at the "0" position of its scale on Sub-Dial Gauge Face (22).

The process continues to step 1609 in which the user manipulating the calibration software program on the connected apparatus may make a determination based on visual inspection as to whether Sub-Dial Indicator (18) is at its "12" position on its scale on Dial Gauge Face (1). If it is, flow moves to step 1607. If it is not, through the users manipulation of the calibration software program's user interface, the calibration software program signals instructions to Microcontroller (4) over the wireless and/or wired communications link to issue control signals to Stepper Motor Controller (3) to displace Stepper Motors (2) so as to position Dial Gauge Indicator (20) at the "0" position of its scale on Sub-Dial Gauge Face (22).

In the above description of FIG. 16 the order of flow control of steps 1603, 1605, 1607 and 1609 may be arbitrary or in another order subsequent to step 1602.

In some usage contexts or system states the dial indicators and sub-dial indicators may have their functionality overloaded. That is, the indicator hands may represent on their corresponding dial gauge faces different data sets in different usage contexts or system states. These aforementioned usage contexts or system states may be deviations from the nominal usage context or system state. The nominal usage context may be described as representing primary data sets such as, for example, velocity, distance traveled, total vertical ascent, activity time duration. (Corresponding to, respectively, in FIG. 1, Dial Gauge Indicator (20); Dial Gauge Indicator (14); Sub-Dial Indicator (21); Sub-Dial Indicator (18)). Deviations from the normative usage context may be described as a subordinate usage context that overloads the functionality of the indicators until the system returns to the normative system state. One such example subordinate usage context may be referred to as a "summary state" in which, for example, the velocity indicator Dial Gauge Indicator (20) shows a cumulative moving average velocity rather than the real-time computed velocity. Another example subordinate usage context may be referred to as an "auto-pause state" in which the time indicator Sub-Dial Indicator (18) shows the current time of day rather than the activity time duration. Another example subordinate usage context may be referred to as a "battery charge level state" in which, for example, the ascent indicator Sub-Dial Indicator (21) shows current battery charge level in proportion to a full battery charge level on Sub-Dial Gauge Face (22), using the position at 90 counter-clockwise from the '0' position to represent that the battery charge level is 0% of full charge, and using the position at 90 degrees clockwise from the '0' position to represent that the battery charge level is 100% of full charge.

Figure 17:
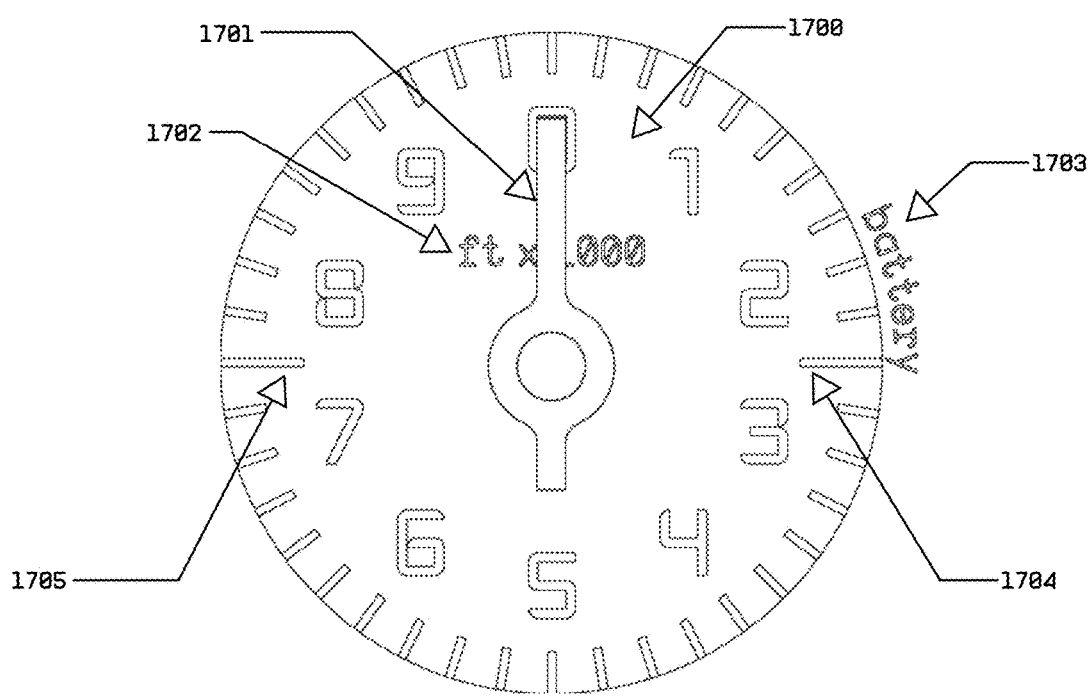
FIG. 17 is an illustration showing close-up detail of an example Sub-Dial Gauge Face in accordance with one embodiment.

FIG. 17 is an illustration showing close-up example detail of Sub-Dial Gauge Face (22) from FIG. 1 for the purposes of further illustrating how in some usage contexts or system states the dial indicators and sub-dial indicators may have their functionality overloaded. For example, the indicator hands may represent different data sets on their corresponding dial gauge faces in different usage contexts or system states. Part 1700 corresponds to Sub-Dial Gauge Face (22) and part 1701 corresponds to Sub-Dial Indicator (21). Part 1702 corresponds to a printed mark on part 1701 to indicate that that the scale on the Sub-Dial Gauge Face (22) corresponds to thousands of feet of vertical ascent. Part 1702 represents the data units used for the normative usage context of part 1700. To further illustrate how part 1700 can be overloaded with multiple functionality it is sufficient to indicate how in this normative usage context, when part 1701 points to graphic mark 1705, the data interpretation would be that 7,500 vertical feet of ascent are represented; when part 1701 points to graphic mark 1704, 2,500 vertical feet of ascent are represented.

One example use context that may be subordinate to the normative usage context of part 1700 may be to represent battery charge level. Under certain conditions and circumstances the bicycle computer enters into the "battery state" mode such as, for example, when the system detects that power has been applied via, for example, USB-C (6) in order to initiate battery charging. In such a case part 1700 may be used to reflect current battery charge level by, for example, representing battery charge level as a ratio between full and empty, where part 1701 would point at graphic mark 1704 to indicate a full, and part 1701 would point at graphic mark 1705 to indicate an empty battery, and part 1701 would point elsewhere in the topmost arc of part 1700 to indicate the proportion of battery charge level between these two extremes. Part 1703 serves as a descriptive graphic or text mark printed on part 1700 to call attention to the sub-ordinate usage context and sub-ordinate data representation of part 1700.

Extending the previously described example, in other circumstances and for other dial or sub-dial gauge faces, different overloaded functionality, representations of system state (for example, satellite search, satellite signal lock count, turn direction, current elevation, time of day, system error) and data representations are possible.

Figure 19:
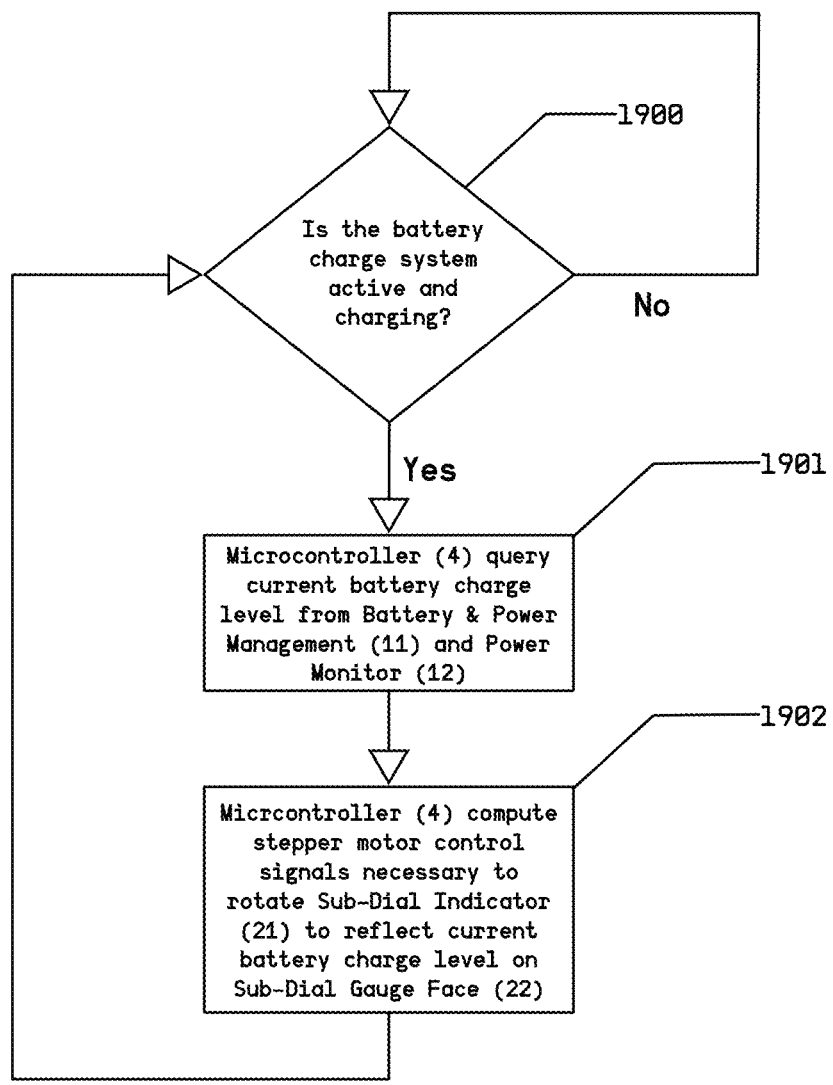
FIG. 19 is a flowchart illustrating one process for stepper motor control to represent charging the bicycle computer internal battery and battery state in which an existing dial face and corresponding dial indication hand is overloaded in its functionality while the bicycle computer is in a battery charging state.
Figure 20:
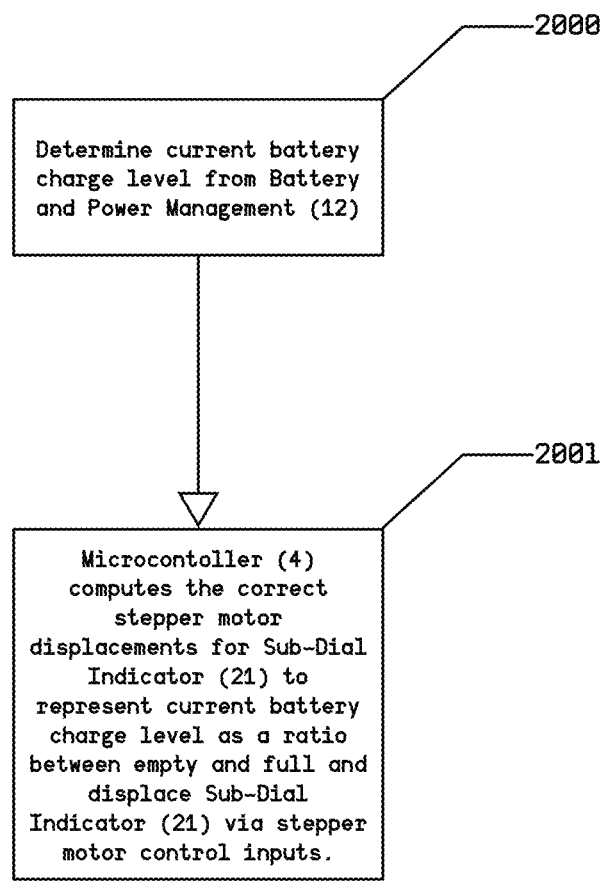
FIG. 20 is a flowchart illustrating an example process for stepper motor control to represent current battery charge level and power system state in which an existing dial face and corresponding dial indication hand is overloaded in its functionality while the bicycle computer is in a state in which it shows current battery charge level and power system state in accordance with one embodiment.

FIGS. 18, 19, 20 represent example processes that overload the functionality of dial indicators and sub-dial indicators. These examples are a subset of possible overloads of functionality. FIG. 18 is a flowchart illustrating one example process for stepper motor control to represent low available battery power state. In the bicycle computer, dial gauges and their corresponding indicator hands may be overloaded as to their functionality by representing different data sets under certain conditions and system states. For example, referring to FIG. 1, Sub-Dial Indicator (21) within Sub-Dial Gauge Face (22) represents vertical ascent and, in certain possible states of the bicycle computer, current battery charge level. Other dial indicator hands may be used to represent current battery and power system states in other possible configurations. When the system enters a state in which the current battery and power system state is to be revealed, Sub-Dial Indicator (21) may be used to represent the relative charge level of the battery using sensors and data provided to Microcontroller (4) by the Power Monitor (11).

Again referring to FIG. 18 and FIG. 1, in step 1800 Microcontroller (4) determines whether or not the Power Monitor (11) indicates that the current battery charge level of Battery and Power Management (12) is below a predetermined threshold. If it is, flow moves to step 1801 in which it is determined whether or not the system is in an active run-state. If the system is in an active run-state, flow moves to step 1802. In step 1802 Microcontroller (4) sends stepper motor control signals to the stepper motors in order to reset all indicator hands to their "zero" positions. In step 1804 Microcontroller (4) queries Power Monitor (11) to determine the current battery charge level. In step 1804, the current battery charge level is used to determine appropriate stepper motor control signals to rotate Sub-Dial Indicator (21) so that it represents on Sub-Dial Gauge Face (22) the relative charge level of the battery using sensors and data provided to Microcontroller (4) by Power Monitor (11).

FIG. 19 is a flowchart illustrating one example process for stepper motor control to represent charging the bicycle computer internal battery and battery state. In the bicycle computer, dial gauges and their corresponding indicator hands may be overloaded as to their functionality by representing different data sets under certain conditions and system states. For example, referring to FIG. 1, Sub-Dial Indicator (21) within Sub-Dial Gauge Face (22) represents vertical ascent and, in certain possible states of the bicycle computer, current battery charge level. Other dial indicator hands may be used to represent current battery and power system states in other possible configurations. When the system enters a state in which the current battery and power system state is to be revealed, Sub-Dial Indicator (21) may be used to represent the relative charge level of the battery using sensors and data provided to Microcontroller (4) by the Power Monitor (11).

Again referring to FIG. 19 and FIG. 1, in step 1900 Microcontroller (4) determines whether or not the Battery and Power Management (12) system is currently charging, which may, for example, occur when a power source is applied to USB-C (6). If it is determined that Battery and Power Management (12) is charging, flow moves to step 1901 in which Microcontroller (4) queries Power Monitor (11) to determine the current battery charge level. In step 1902, the current battery charge level is used to determine appropriate stepper motor control signals to rotate Sub-Dial Indicator (21) so that it represents on Sub-Dial Gauge Face (22) the relative charge level of the battery using sensors and data provided to Microcontroller (4) by Power Monitor (11).

FIG. 20 is a flowchart illustrating one example process for stepper motor control to represent current battery charge level and power system state. In the bicycle computer, dial gauges and their corresponding indicator hands may be overloaded as to their functionality by representing different data sets under certain conditions and system states. For example, referring to FIG. 1, Sub-Dial Indicator (21) within Sub-Dial Gauge Face (22) represents vertical ascent and, in certain possible states of the bicycle computer, current battery charge level. Other dial indicator hands may be used to represent current battery and power system states in other possible configurations. When the system enters a state in which the current battery and power system state is to be revealed, Sub-Dial Indicator (21) may be used to represent the relative charge level of the battery using sensors and data provided to Microcontroller (4) by Power Monitor (11).

Again referring to FIG. 20 and FIG. 1, in step 2000 the current battery charge level of Battery and Power Management (12) is communicated to Microcontroller (4) via Power Monitor (11). In step 2001 Microcontroller (4) computes the correct stepper motor displacement in order to represent the current battery charge level determined in step 2000, and displaces Sub-Dial Indicator (21) via stepper motor control inputs.

Figure 21:
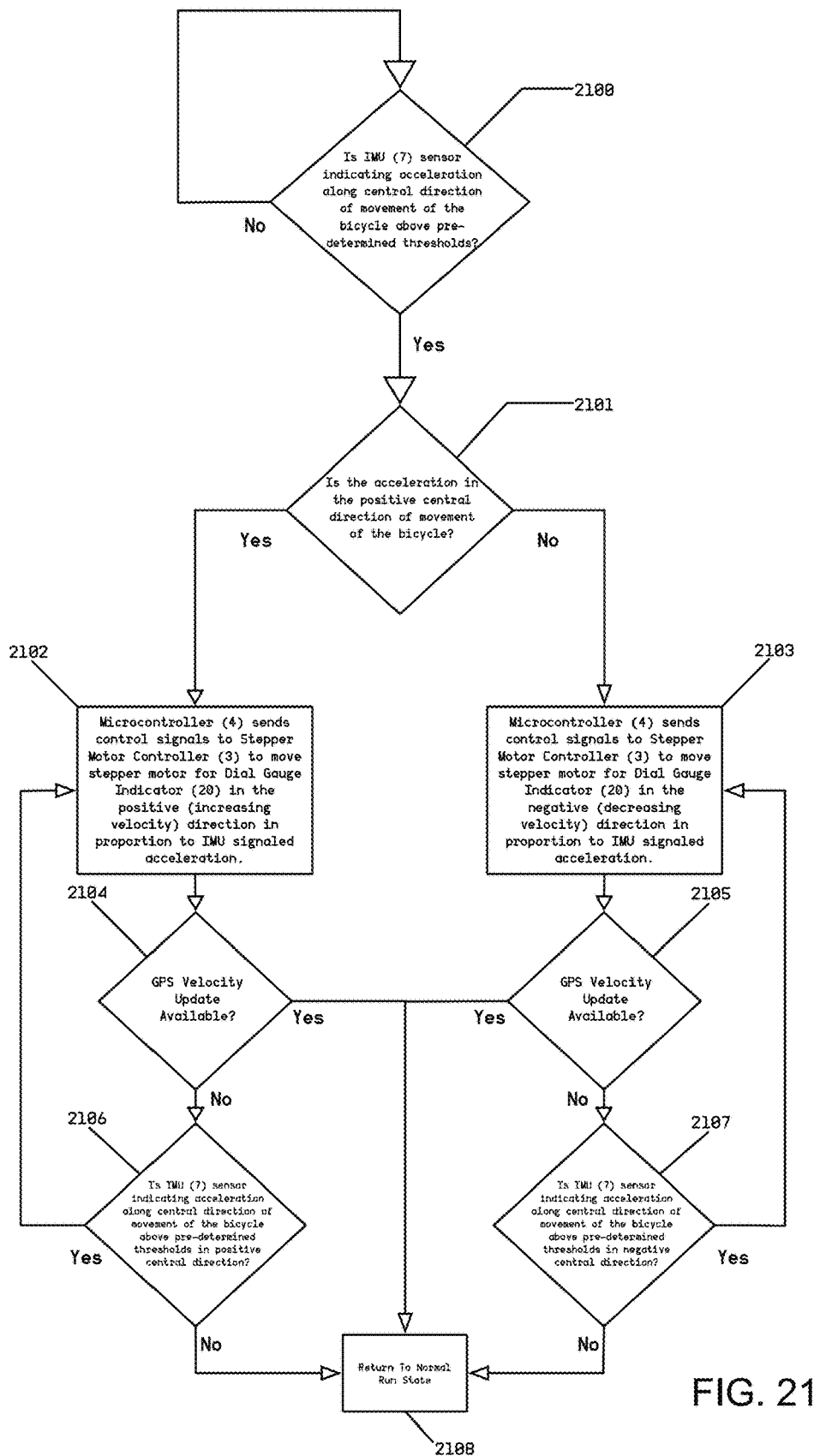
FIG. 21 is a flowchart illustrating an example process for using an inertial measurement unit (IMU) to anticipate changes in velocity prior to updates from the GPS system in accordance with one embodiment.

FIG. 21 is a flowchart illustrating one example process for using IMU (7) (refer to FIG. 1) to anticipate changes in velocity prior to updates from the GPS system. GPS systems can, during very rapid changes in velocity, propagate the effects of a time delay between what the GPS measures and what the actual velocity may be. One of the causes of this delay may be attributed to the 1 Hz update rate of a typical GPS, which is to say a typical GPS may signal positioning and velocity data to an attached control system no more than once per second. There may be other systemic effects for delays between the velocity calculated from the GPS signals and actual velocity of the bicycle. In 1 second a bicycle may experience a significant change in velocity, for example, under hard braking conditions. To mitigate the effect of a GPS update rate which may result in an apparent delay in actual velocity and GPS velocity, an IMU may provide relevant acceleration data which may anticipate changes in velocity prior to time-delayed velocity data signaled from a GPS. An IMU is generally capable of measuring inertial measurement across 3-, 6- or 9-axes, and may combine the data of an accelerometer, gyroscope and magnetometer and thus provide a robust sensing platform for determining static and dynamic acceleration, orientation and rotation. As an adjunct to GPS velocity measurements, an IMU can provide a Microcontroller additional means to determine impending changes in velocity between the GPS position and velocity updates. Including IMU measurements as part of an overall algorithm for providing control signals to a stepper motor control allows the system as a whole to more accurately represent velocity by anticipating significant changes in velocity in addition to data signaled from the GPS, either during or in between GPS velocity updates.

Significant changes in velocity may be defined as a minimum threshold acceleration determined to represent an acceleration that would result in a change in velocity of a sufficient magnitude that it would result in the appearance of a delay between the representation of velocity according to the position of Dial Gauge Indicator (20) and the sense of change in velocity the cyclist would notice. In anticipation of significant acceleration as detected by IMU (7), such as might occur when braking rapidly for example, Microcontroller (4) may send control signals to Stepper Motor Controller (3) to begin moving the stepper motor attached to Dial Gauge Indicator (20) in the negative, lower-velocity direction prior to a velocity update from the GPS system. The overall presentation of the motion of Dial Gauge Indicator (20) may offer to the cyclist the appearance of a more accurate indication of change in velocity, reduce the appearance of a delay in the representation, and provide a more representative spatial motion and movement dynamic to the movement of Dial Gauge Indicator (30).

Again referring to FIG. 21 and FIG. 1, in step 2100 a determination is made as to whether or not the IMU has detected an acceleration along the central direction of movement of the bicycle that is above a pre-determined threshold. That pre-determined threshold is one for which acceleration represents a significant change in velocity representative of especially rapid deceleration or acceleration in the normal direction of movement. If it is determined that the threshold has not been exceeded, the system continues to effectively poll (or otherwise be alerted to the IMU state) by returning to step 2100. If it is determined that the threshold has been exceeded, in step 2101 it is determined whether or not the acceleration is in the positive (forward) or negative (backwards) direction, representing increasing velocity (going faster) or decreasing velocity (slowing down) respectively. If it is determined in step 2101 that there has been a decrease in velocity, flow moves to step 2103 wherein Microcontroller (4) sends control signals to Stepper Motor Controller (3) to cause the stepper motor attached to Dial Gauge Indicator (20) in the negative (counter-clockwise) direction to represent a decrease in velocity. The rate which the Stepper Motor Controller (3) is signaled to turn the stepper motor attached to Dial Gauge Indicator (20) is computed by Microcontroller (4) and is generally based on the degree to which the IMU detected acceleration exceeds the pre-determined threshold. In some embodiments, the stepper motor rate is a function of the IMU measured acceleration, the pre-determined acceleration threshold, the length of time the acceleration has been above the pre-determined threshold, and/or the length of time since the last GPS update. The pre-determined acceleration threshold may be determined empirically and in relation to the expected worst case GPS update rate.

In step 2105, it is determined whether the GPS has received a velocity update. If a GPS update has been received in step 2105, flow moves to step 2108 in which the system returns to normal run state. If a GPS update has not been received, flow moves to step 2107 in which it is determined whether IMU detected acceleration along the central direction of movement of the bicycle is in the negative (backwards) direction, representing a decrease in velocity. Step 2107 effectively determines whether there continues to be a decrease in velocity at a rate that is above the pre-determined threshold since step 2100. If this determination indicates that, since step 2100, there continues to be a decrease in velocity at a rate that is above the pre-determined threshold, flow moves to step 2103 and Microcontroller (4) again signals to Stepper Motor Controller (3) to continue to cause the stepper motor attached to Dial Gauge Indicator (20) to move in the negative (counter-clockwise) direction to represent a decrease in velocity. If in step 2107 it is determined that the IMU detected acceleration along the central direction of movement of the bicycle is no longer above the pre-determined threshold, flow moves to step 2108 in which the system returns to normal run state.

Referring again to FIG. 21, if in step 2101 it is determined that there has been an increase in velocity, flow moves to step 2102 which initiates a control flow path similar to that of step 2103, with the primary difference being that acceleration has been detected in the positive (forward) direction representing an increase in velocity (going faster). The primary differences between the control flow path of step 2102 in relation to step 2103 are acceleration direction and subsequently the clock-wise direction the stepper motor attached to Dial Gauge Indicator (20) is turned by Stepper Motor Controller (3) under signal control of Microcontroller (4). The description for the control flow path of step 2103 serves as a description of that of step 2102 with the substitution of direction of acceleration (positive) and direction of stepper motor rotation (clockwise).

Figure 22:
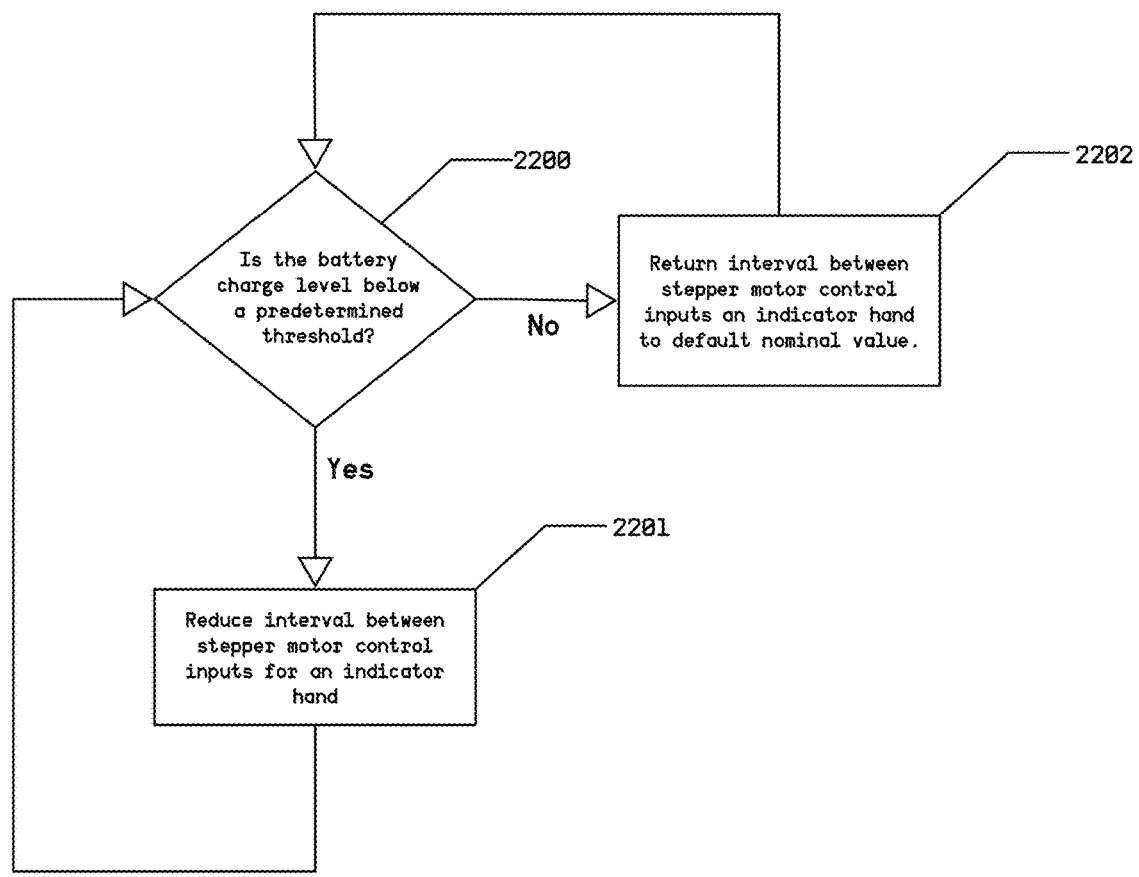
FIG. 22 is a flowchart illustrating an example adaptive stepper motor control for the indicator hands in order to minimize power drain in accordance with one embodiment.

FIG. 22 is a flowchart illustrating an example adaptive stepper motor control for the indicator hands in order to minimize power drain. Input of control signals to the stepper motors which activate and displace the stepper motors requires some power drawn from the battery, thereby reducing available charge in the battery and subsequently reducing run time between battery re-charges. During System Run State, control signals to the stepper motors occurs at a nominal, default time interval if it is necessary to reflect updated data derived and computed based upon data sources such as, for example, system clock, GPS, barometric pressure-sensor. That time interval is determined by a desire to reflect the most recent data as quickly as possible using the various indicator hands. If a low-power state is deemed necessary to extend the run-time of the bicycle computer, the system can extend the time interval between control signal inputs to the stepper motors, thereby reducing the average power consumed over time. An algorithm can adapt the time intervals during which stepper motor control signals are applied to the stepper motor. By extending the time intervals during stepper motor control signals, the frequency at which a stepper motor is activated is reduced resulting in power savings relative to nominal time intervals between stepper motor control signals.

Referring again to FIG. 22, in step 2200 a determination is made as to the battery charge level of the Battery and Power Management (12) system. If the battery charge level is below some pre-determined level (as measured relative to a full battery charge level) that is deemed to demand putting the system into a low-power, conservative power utilization state, flow moves to step 2201 in which the interval between stepper motor control inputs between Microcontroller (4) and Stepper Motor Controller(s) (3) is reduced to a new "low-power" time interval greater than the default nominal time interval. Flow then moves to step 2200 where the charge level is again checked against a pre-determined level. If in step 2200 it is determined that the battery charge level is at or above a pre-determined charge level, flow moves to step 2202 in which the time interval between stepper motor control inputs is returned to a default nominal value.

In practice, an adaptive stepper motor control algorithm would benefit the indicator hands that move with the highest frequency such as, for example, the velocity indicator hand. Indicator hands that move with much less frequency such as, for example, vertical ascent, time and distance, would benefit from an adaptive stepper motor control algorithm but to a much less significant degree than, for example, the velocity indicator hand and therefor may not have an adaptive stepper motor control algorithm applied.

In some embodiments, a user may be able to enable low power mode even when the battery is not below the "low-level" threshold by changing the configuration of the device using when connecting the bicycle computer to an external apparatus or by using a mechanical interface of the bicycle computer.

Figure 23:
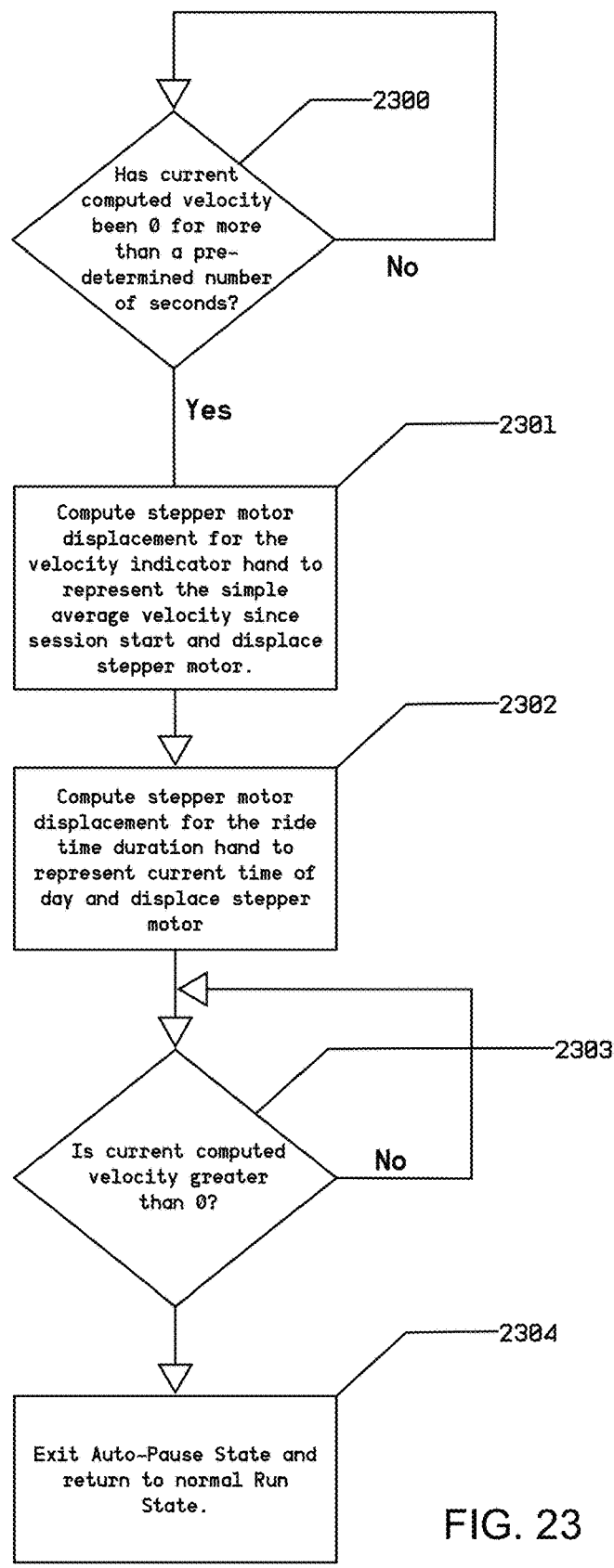
FIG. 23 is a flowchart illustrating an example stepper motor control when the device enters auto-pause state in accordance with one embodiment.

FIG. 23 is a flowchart illustrating an example stepper motor control when the device enters auto-pause state. Auto-Pause is a state the bicycle computer enters when there has been some period of time of length determined by the configuration of the system during which the computed velocity is zero. In the flowchart, reference is made to velocity indicator hand and elapsed activity time (duration) indicator hand. In referring to FIG. 1, the velocity indicator hand may be Dial Gauge Indicator (20), and the elapsed activity time indicatory hand may be Sub-Dial Indicator (10). The computed velocity may be as calculated in FIG. 24, step 2402. In step 2300 a determination is made as to whether the auto-pause state should be entered based on the computed velocity being equal to zero for some predetermined period of time, for example 20 seconds. If it is determined that the computed velocity has not been zero for the predetermined period of time, the flow returns to step 2300. If it is determined that the computed velocity has been zero for some period of time, flow moves to step 2301, entering the Auto-Pause State. In step 2301, stepper motor control is computed for displacement of the velocity indicator hand to represent cumulative moving average computed velocity since session start, where session start represents the time when velocity was first detected. One formula for computing cumulative moving average computed velocity at interval t+1, with computed velocity $VGPS_{t+1}$ at time interval t+1 is:

$$CMAV_{t+1} = CMAV_t + \frac{VGPS_{t+1} - CMAV_t}{t+1}$$

wherein $VGPS_{t+1}$ is the computed velocity from the GPS data at time interval t+1 and CMAVt+1 is the cumulative moving average velocity at time interval t+1, and CMAVt is the cumulative moving average velocity at time interval t.

The cumulative moving average computed velocity would, in most instances, exclude computed velocity during auto-pause states. In step 2302, stepper motor control is computed for displacement of the elapsed activity time indicator to represent current time. In step 2303 if computed velocity is no longer zero, the system exits the Auto-Pause State, returning to normal Run State, resulting in stepper motor control returning the velocity indicator hand and the duration indicator hand to represent computed velocity and elapsed activity time respectively.

Figure 24:
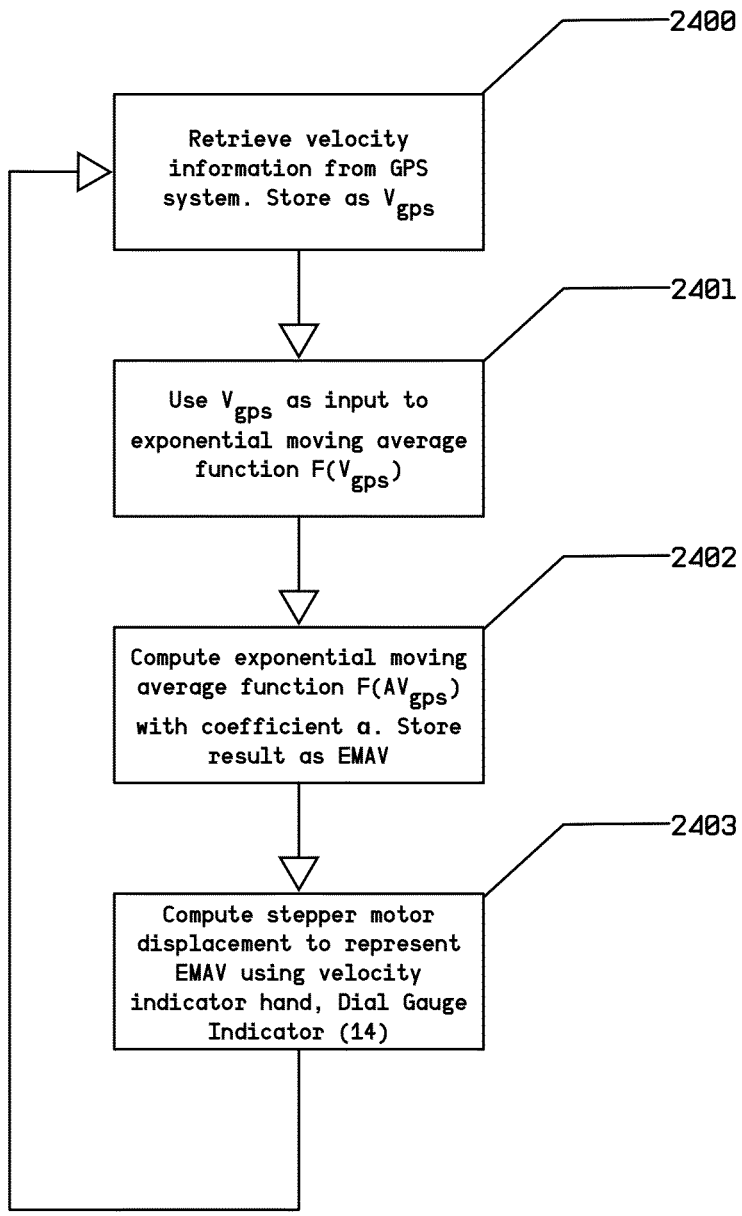
FIG. 24 is a flowchart illustrating an example process for stepper motor control to position the velocity indicator hand in accordance with one embodiment.

FIG. 24 is a flowchart illustrating an example process for stepper motor control to position the velocity indicator hand. Velocity as transmitted to and decoded by Microcontroller (4) by the GPS (9) is generally accurate to the bicycle's actual velocity, but requires filtering and smoothing to mitigate the deleterious effects of high-frequency changes as represented by the precision of the GPS system's reported velocity. GPS systems report velocity to the tenths of velocity units (typically Knots) and thus have small fluctuations that would result in high-frequency jitter and micro-movements in the displacement of a stepper motor and its attached indicator hand representing velocity on a dial gauge face. This jitter in the form of stepper motor and attached indicator hand micro-movements can be smoothed and filtered with an appropriate filtering algorithm applied to the time-series of velocity. Such a filtering algorithm would process the time-series of velocity and attenuate high-frequency fluctuations in velocity as transmitted by the GPS (9) so as to maintain an accurate representation of velocity by effectively filtering out the time-series velocity data stream transmitted from the GPS (9) to Microcontroller (4) before Microcontroller (4) sends control signals to the stepper motor controller. The time-series of precise (tenths of velocity units) velocity data can be understood as overly-precise for applying control signals to a stepper motor where representation of accurate velocity is more relevant than overly precise representations of velocity which may over burden the system with unnecessary stepper motor movements resulting in higher power consumption and mechanical stress, with no significant gain in performance and function.

Referring again to FIG. 24, one such possible filtering algorithm might be a standard exponential moving average applied to the velocity as transmitted by GPS (9) to Microcontroller (4). In step 2400 velocity information is retrieved from the GPS (cf. FIG. 5 computing current velocity from the GPS system). This velocity is stored as $V_{gps}$. In step 2401 time-$V_{gps}$ is used as input to an exponential moving average velocity function. In step 2402 an exponential moving average velocity is computed using $V_{gp}$ as input. One such exponential moving average velocity function can be represented as:

$$EMAV_t = EMAV_{(t-1)} + \alpha * (VGPS - EMAV_{(t-1)})$$

Where the $EMAV_t$ is the exponential moving average velocity at time interval t; $EMAV_{(t-1)}$ is the exponential moving average at time interval (t−1); VGPS is the velocity as retrieved in step 2400; α is a coefficient weighting factor between 0-1 which may vary based on the range of velocity values in order to obtain optimal filtering and smoothing of high-frequency changes.

In step 2403 the computed $EMAV_t$ is used to compute stepper motor control instructions to displace the stepper motor connected to the Dial Gauge Indicator (14) in order that it indicates $EMAV_t$ on the appropriate dial gauge face, i.e. Dial Gauge Face (1).

In one example embodiment, GPS velocity information as communicated by GPS (9) is represented via the Dial Indicator Hand (14) as a velocity on Dial Gauge Face (1). Microcontroller (4) in communication with GPS (9) via Data Bus (5) and reads standard sets of NMEA data "sentences" as produced at time intervals by GPS (9). Microcontroller (4) parses these data sentences, interprets the given data, and thence performs computations and calculations to determine velocity in the appropriate units represented on the Dial Gauge Face (1), converting velocity units as given by GPS (9) using appropriate unit conversion factors. In communication with Stepper Motor Controller (2) Microcontroller (4) causes the appropriate stepper motor in Stepper Motor Assembly (2) to rotate clockwise or counter-clockwise an appropriate number of steps such that Dial Gauge Indicator (14) indicates the velocity as previously computed on Dial Gauge Face (1). The flowchart in FIG. 5 reveals one process for retrieving current velocity from the GPS system.

In one example embodiment, GPS location information provided by GPS (9) is accumulated by Microcontroller (4) in order to compute total distance traveled. In communication with Stepper Motor Controller (3) Microcontroller (4) causes a stepper motor in Stepper Motor Assembly (2) to step rotate clockwise an appropriate number of steps such that Dial Gauge Indicator (20) indicates total distance traveled on Dial Gauge Face (1). For distances greater than that printed on Dial Gauge Face (1), multiple revolutions can occur and represent cumulative increments of the full circular scale. The flowchart in FIG. 6 reveals one example process for computing total traveled distance.

In one example embodiment, pressure elevation data provided by Barometric Pressure Sensor (8) is used to compute total vertical ascent by Microcontroller (4). In communication with Stepper Motor Controller (3) Microcontroller (4) causes a stepper motor in Stepper Motor Assembly (2) to step rotate clockwise an appropriate number of steps such that Sub-Dial Indicator (21) indicates total cumulative vertical ascent on Sub-Dial Gauge Face (22). The flowchart in FIG. 7 reveals one example process for computing total cumulative vertical ascent.

In one example embodiment, total activity time information is computed by either or both the GPS (9) and real-time clock subsystem of Microcontroller (4). In communication with Stepper Motor Controller (2) Microcontroller (4) causes a stepper motor in Stepper Motor Assembly (2) to step an appropriate number of steps such that Sub-Dial Indicator (18) indicates the current time in the single-hand mode of timepieces on Sub-Dial Gauge Face (19). Such a single-hand mode of time representation indicates time of day as a single indicator hand rotating about a circular dial face marked by 12 divisions so as to represent 12 hours. The indicator hand may represent the time of day by turning to indicate the current hour and sub-division of the hour similar to the way in which a standard two-hand clock would without the minute hand. The flowchart in FIG. 8 reveals an example of how total activity time is computed.

In one example embodiment, average GPS velocity information as computed by Microcontroller (4) is represented via the Dial Indicator Hand (14) as an average velocity on Dial Gauge Face (1) when the device has been stationary for some pre-configured amount of time, or in lieu of representing real-time velocity. In communication with Stepper Motor Controller (2) Microcontroller (4) causes a stepper motor in Stepper Motor Assembly (2) to step rotate an appropriate number of steps such that Dial Gauge Indicator (14) indicates average velocity on Dial Gauge Face (1).

Average velocity may be calculated by the Microcontroller (4). It is an additive sum of current velocities as computed by the flowchart of FIG. (5) and dividing that sum by the total activity time.

In one example embodiment, current battery level is computed and communicated via Power Monitor (11) and Microcontroller (4). Current battery level can be represented at useful times during the operation of the device, such as when a user turns the device on, turns the device off, during charging state or during low power state. In communication with Stepper Motor Controller (2) Microcontroller (4) causes a stepper motor in Stepper Motor Assembly (2) to step rotate clockwise an appropriate number of steps such that Dial Gauge Indicator (21) indicates the current battery level on Dial Gauge Face (22).

In an additional example embodiment, an alternative Dial Gauge Face (1) indicates a different configuration of data sets such as, for example, power output of the cyclist, heart rate, cadence, and/or a timer. In an additional example embodiment, an alternative Dial Gauge Face (1) indicates a different configuration of data sets such as, for example, directional turn indication. In an additional example embodiment, an alternative Dial Gauge Face (1) may also include data sets such as, for example, time-per-distance (pace), compass direction.

Additional Considerations

A cycling computer configuration as disclosed provides benefits and advantages. For example, may be advantageous to use physical and mechanical hands and face as such increase legibility in direct and indirect sunlight as encountered in outdoor usage, in comparison to digital displays which are well-known to have legibility problems due to their inability to operate legibly in the high-contrast and high-brightness typical of outdoor usage; the nature of the activity of cycling is such that change in the value of data, such as velocity, is as important, and in some instances, more important than current absolute value at any given instant in time; and gauge-type displays are well-known to provide an advantageous representation of specifically data change over digit-based display based on their spatialization of information over the course of, in this embodiment, rotation around a circular indicator face; it is well-known in the ergonomic design of instrumentation that observing the spatial arrangement of indicator hands to determine the state of a system, for example, velocity of a moving vehicle or time of day, has advantages in the interpretation of an indicated value over the interpretation of a number represented digitally, particularly when the spatial arrangement of an indicator hand pursues a course over a fixed indicator face where the operator quickly learns the absolute values as printed on the indicator face and can intuitively understand that an indicator hand seen at a glance at an angle A across the indicator face always represents the value as printed at angle A. This last advantage is similar to the intuitive fashion by which one reads the face of a gauge-type ("analog") face of a wristwatch or clock, where one does not necessarily need to parse the specific position of the minute and hour hands in relation to the digits which may be printed around the circumference of the face; rather one versed in the reading of clocks is able to quickly interpret at a glance the representation of time of day based on the hands' relative spatial relationship.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 2-11 and 18-24. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for gauge type cycle computer through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A cycling gauge assembly comprising:
a housing having a rotating bezel, a transparent cover, and a rear cover, the transparent cover structured to fit within the rotating bezel, the rotating bezel structured to fit at least partially over the rear cover;
a dial gauge face having a top and a bottom and structured behind the transparent cover, the dial gauge face having a first slot and a second slot;
a first antenna having a portion coupled with the first slot of the dial gauge face and a portion along a bottom of the dial gauge face;
a second antenna having a portion coupled with the second slot of the dial gauge face and a portion along a bottom of the dial gauge face;
a motor assembly coupled with the dial gauge face;
a printed circuit having a microcontroller, a Bluetooth circuit, and a global positioning system (GPS) circuit, the microcontroller coupled to drive the motor assembly, the Bluetooth circuit coupled with the first antenna, and the GPS circuit coupled with the second antenna; and
a battery coupled with the printed circuit to provide power to the printed circuit.

2. The cycling gauge assembly of claim 1, wherein the top of the dial gauge comprises a dial gauge face and a plurality of sub-dial faces.

3. The cycling gauge assembly of claim 2, wherein the motor assembly further comprises a first stepper motor coupled with a first rotatable dial gauge indicator and a second stepper motor coupled with a second rotatable dial gauge indicator, wherein the first rotatable dial gauge indicator and the second rotatable dial gauge indicator are coaxial about a center of the dial gauge face.

4. The cycling gauge assembly of claim 3, wherein the motor assembly further comprises:
a third stepper motor coupled with a first rotatable sub-dial indicator, the first rotatable sub-dial indicator positioned about a center of a first sub-dial face of the plurality of sub-dial faces; and
a fourth stepper motor coupled with a second rotatable sub-dial indicator, the second rotatable sub-dial indicator positioned about a center of a second sub-dial face of the plurality of sub-dial faces.

5. The cycling gauge assembly of claim 4, wherein the microcontroller is configured to receive GPS data from the GPS circuit to drive at least one at least one of the first stepper motor, the second stepper motor, the third stepper motor and the fourth stepper motor.

6. The cycling gauge assembly of claim 5, wherein the GPS circuit provides GPS data to compute a cumulative moving average computed velocity in a predefined interval by calculating:

$$CMAV_{t+1} = CMAV_t + \frac{VGPS_{t+1} - CMAV_t}{t+1}$$

wherein $VGPS_{t+1}$ is the computed velocity from the GPS data at time interval t+1 and $CMAV_{t+1}$ is the cumulative moving average velocity at time interval t+1, and $CMAV_t$ is the cumulative moving average velocity at time interval t.

7. The cycling gauge assembly of claim 4, wherein the microcontroller is configured to receive Bluetooth data from the Bluetooth circuit to drive at least one of the first stepper motor, the second stepper motor, the third stepper motor, and the fourth stepper motor.

8. A gauge assembly for a moving vehicle, the gauge assembly enclosed in a housing and comprising:
a dial gauge face having a top and a bottom and structured behind a transparent cover, the dial gauge face having a first slot and a second slot;
a first antenna having a portion coupled with the first slot of the dial gauge face and a portion along a bottom of the dial gauge face;
a second antenna having a portion coupled with the second slot of the dial gauge face and a portion along a bottom of the dial gauge face;
a motor assembly coupled with the dial gauge face; and
a printed circuit having a microcontroller, a short range radio circuit, and a global positioning system (GPS) circuit, the microcontroller coupled to drive the motor assembly, the short range radio circuit coupled with the first antenna, and the GPS circuit coupled with the second antenna.

9. The gauge assembly of claim 8, wherein the top of the dial gauge comprises a dial gauge face and a plurality of sub-dial faces.

10. The gauge assembly of claim 9, further comprising a battery coupled with the printed circuit to provide power to the printed circuit and the motor assembly.

11. The gauge assembly of claim 10, wherein the motor assembly further comprises a first stepper motor coupled with a first rotatable dial gauge indicator and a second stepper motor coupled with a second rotatable dial gauge indicator, wherein the first rotatable dial gauge indicator and the second rotatable dial gauge indicator are coaxial about a center of the dial gauge face.

12. The gauge assembly of claim 11, wherein the motor assembly further comprises:
a third stepper motor coupled with a first rotatable sub-dial indicator, the first rotatable sub-dial indicator positioned about a center of a first sub-dial face of the plurality of sub-dial faces; and
a fourth stepper motor coupled with a second rotatable sub-dial indicator, the second rotatable sub-dial indicator positioned about a center of a second sub-dial face of the plurality of sub-dial faces.

13. The cycling gauge assembly of claim 11, wherein the microcontroller is configured to receive GPS data from the GPS circuit to drive at least one at least one of the first stepper motor, the second stepper motor, the third stepper motor, and the fourth stepper motor.

14. The gauge assembly of claim 13, wherein the GPS circuit provides GPS data to compute a cumulative moving average computed velocity in a predefined interval by calculating:

$$CMAV_{t+1} = CMAV_t + \frac{VGPS_{t+1} - CMAV_t}{t+1}$$

wherein $VGPS_{t+1}$ is the computed velocity from the GPS data at time interval t+1 and $CMAV_{t+1}$ is the cumulative moving average velocity at time interval t+1, and $CMAV_t$ is the cumulative moving average velocity at time interval t.

15. The gauge assembly of claim 11, wherein the microcontroller is configured to receive short range radio data from the short range radio circuit to drive at least one of the first stepper motor, the second stepper motor, the third stepper motor, and the fourth stepper motor.

\* \* \* \* \*

UNITED STATES PATENT AND TRADEMARK OFFICE
CERTIFICATE OF CORRECTION

Page 1 of 1

PATENT NO. : 10,053,178 B2
APPLICATION NO. : 15/730612
DATED : August 21, 2018
INVENTOR(S) : Julian Bleecker et al.

It is certified that error appears in the above-identified patent and that said Letters Patent is hereby corrected as shown below:

In the Claims

Column no: 25, Line(s): 51, Claim 5: delete "at least one"

Column no: 26, Line(s): 49, Claim 13: "The cycling gauge assembly" to read as --The gauge assembly--

Column no: 28, Line(s): 51, Claim 13: delete "at least one"

Signed and Sealed this
Eighteenth Day of June, 2019

Andrei Iancu
*Director of the United States Patent and Trademark Office*